(12) United States Patent
Riesing et al.

(10) Patent No.: US 9,991,958 B2
(45) Date of Patent: Jun. 5, 2018

(54) SATELLITE TRACKING WITH A PORTABLE TELESCOPE AND STAR CAMERA

(71) Applicants: Kathleen Michelle Riesing, Cambridge, MA (US); Hyosang Yoon, Cambridge, MA (US); Kerri Lynn Cahoy, Lexington, MA (US)

(72) Inventors: Kathleen Michelle Riesing, Cambridge, MA (US); Hyosang Yoon, Cambridge, MA (US); Kerri Lynn Cahoy, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days. days.

(21) Appl. No.: 15/625,288

(22) Filed: Jun. 16, 2017

(65) Prior Publication Data

US 2017/0366264 A1    Dec. 21, 2017

Related U.S. Application Data

(60) Provisional application No. 62/350,884, filed on Jun. 16, 2016.

(51) Int. Cl.
*H04B 10/118* (2013.01)
*H04B 10/61* (2013.01)
*G01S 3/786* (2006.01)

(52) U.S. Cl.
CPC ............ *H04B 10/118* (2013.01); *G01S 3/786* (2013.01); *H04B 10/615* (2013.01)

(58) Field of Classification Search
CPC ...... H04B 10/118; H04B 10/615; G01S 3/786
(Continued)

(56) References Cited

U.S. PATENT DOCUMENTS 5,142,400 A    8/1992    Solinsky
5,159,489 A    10/1992    Massie et al.
(Continued)

OTHER PUBLICATIONS

Behzad Abareshi, Robert Marshall, Shelby Gott, David Sprayberry, Rolando Cantarutti, Dick Joyce, Doug Williams, Ronald Probst, Kristin Reetz, Anthony Paat, Karen Butler, Christian Soto, Arjun Dey, and David Summers. A new telescope control software for the Mayall 4-meter telescope. In *Proc. of SPIE vol. 9913, Software and Cyberinfrastructure for Astronomy IV*, pp. 99131O-1-12, 2016.
(Continued)

*Primary Examiner* — Dalzid Singh
(74) *Attorney, Agent, or Firm* — Cooley LLP

(57) ABSTRACT

A portable optical ground station can track a satellite with an amateur telescope mounted on a two-axis gimbal. The telescope is aligned with respect to an inertial, Earth-fixed frame using a wide field of view star camera. Star cameras are accurate to the arcsecond level and have the advantage of providing orientation with a single measurement. Using multiple star sensor measurements at different gimbal angles, it is possible to calculate the alignment of the gimbals in the Earth-fixed frame and the alignment of the star sensor in the gimbal frame. Once the alignment is obtained, satellite tracking can be achieved with a known orbit and precise Earth rotation model, such as the International Earth Rotation and Reference System Service (IERS). This alignment procedure can be carried out in less than one hour, making it practical to move and deploy the portable ground station.

19 Claims, 22 Drawing Sheets

(58) Field of Classification Search
USPC .......................................................... 398/131
See application file for complete search history.

(56) References Cited

U.S. PATENT DOCUMENTS

| | | | |
|---|---|---|---|
| 5,710,652 A * | 1/1998 | Bloom ................. | H04B 10/118 398/129 |
| 7,925,167 B1 | 4/2011 | Kozubal et al. | |
| 8,169,623 B2 | 5/2012 | McComas et al. | |
| 2003/0156324 A1 | 8/2003 | Baun et al. | |
| 2008/0174863 A1 | 7/2008 | Whorton | |
| 2009/0148065 A1* | 6/2009 | Halsted ................. | G06T 3/4061 382/284 |
| 2009/0177398 A1 | 7/2009 | Belenkii et al. | |
| 2011/0234787 A1 | 9/2011 | Tyc et al. | |
| 2013/0193303 A1 | 8/2013 | Smith et al. | |
| 2013/0233996 A1 | 9/2013 | Taylor et al. | |

OTHER PUBLICATIONS

Randall J. Alliss and Billy Felton. The mitigation of cloud impacts on free-space optical communications. In *Proc. of SPIE vol. 8380, Atmospheric Propagation IX*, pp. 83800S-1-12, 2012.
L. C. Andrews and R. L. Phillips. *Laser beam propagation through random media.* SPIE Press, Bellingham, WA, USA, 2nd edition, Chapter 12, 77 pages, 2005.
Daniel M. Azari and Brad Ehrhorn. Autonomous Low Earth Orbit Satellite and Orbital Debris Tracking using Mid Aperture COTS Optical Trackers. In Proc. of the Advanced Maui Optical and Space Surveillance Technologies Conference, 11 pages, 2007.
Thomas Berkefeld, Dirk Soltau, Reinhard Czichy, Edgard Fischer, Bernhard Wandernoth, and Zoran Sodnik. Adaptive optics for satellite-to-ground laser communication at the 1m Telescope of the ESA Optical Ground Station, Tenerife, Spain. In Proc. of SPIE vol. 7736, Adaptive Optics Systems II, pp. 77364C-1-8, 2010.
Abhijit Biswas, Keith E. Wilson, Sabino Piazzolla, Janet P. Wu, and William H. Farr. Deep-space Optical Communications Link Availability and Data Volume. Proc. of SPIE vol. 5338, Free-Space Laser Communication Technologies XVI, pp. 175-183, 2004.
Abhijit Biswas, Joseph M. Kovalik, Malcolm W. Wright, and William T. Roberts. Optical Communications Telescope Laboratory (OCTL) Support of Space to Ground Link Demonstrations. In 13th International Conference on Space Operations, pp. 1-14, May 2014.
D. M. Boroson, B. S. Robinson, D. A. Burianek, D. V. Murphy, and A. Biswas. Overview and Status of the Lunar Laser Communications Demonstration. In Proc. of SPIE vol. 8246, Free-Space Laser Communication Technologies XXIV, pp. 82460C-1-10, 2012.
Don M. Boroson, Bryan S. Robinson, Daniel V. Murphy, Dennis A. Burianek, Farzana Khatri, Joseph M. Kovalik, Zoran Sodnik, and Donald M. Cornwell. Overview and Results of the Lunar Laser Communication Demonstration. In Proc. of SPIE vol. 8971, Free-Space Laser Communication and Atmospheric Propagation XXVI, pp. 89710S-1-11, 2014.
Celestron. CPC Series Instruction Manual. Technical report, 61 pages, 2009.
Chien-Chung Chen. Link and System Design. In Deep Space Optical Communications, chapter 2. John Wiley & Sons, Inc., pp. 83-119, 2006.
Emily Clements, Raichelle Aniceto, Derek Barnes, David Caplan, James Clark, Iñigo del Portillo, Christian Haughwout, Maxim Khatsenko, Ryan Kingsbury, Myron Lee, Rachel Morgan, Jonathan Twichell, Kathleen Riesing, Hyosang Yoon, Caleb Ziegler, and Kerri Cahoy. Nanosatellite optical downlink experiment: design, simulation, and prototyping. Optical Engineering, 55(11), pp. 111610-1-18, 2016.
Kim T. Constantikes. The GBT precision telescope control system. In *Proc. of Astronomical Society of the Pacific Conference Series vol. 314, Astronomical Data Analysis Software and Systems XIII*, pp. 689-696, 2004.

Bill Doncaster, Jordan Shulman, John Bradford, and John Olds. SpaceWorks' 2016 Nano/Microsatellite Market Forcast. In *Proceedings of the 30th Annual AIAA/USU Conference on Small Satellites*, pp. 1-6, 2016.
ESA. Laser Communications Set for Moon Mission. http://www.esa.int/Our_Activities/Operations/Laser_communications_set_for_Moon_mission, 3 pages, 2013. Accessed: Apr. 21, 2017.
R. Fields, D. Kozlowski, H. Yura, R. Wong, J. Wicker, C. Lunde, M. Gregory, B. Wandernoth, and F. Heine. 5.625 Gbps bidirectional laser communications measurements between the NFIRE satellite and an Optical Ground Station. In *Proceedings of International Conference on Space Optical Systems and Applications*, pp. 44-53, 2011.
Edgar Fischer, Thomas Berkefeld, Mikael Feriencik, Marco Feriencik, Volker Kaltenbach, Dirk Soltau, Bernhard Wandernoth, Reinhard Czichy, Jens Kunde, Karen Saucke, Frank Heine, Mark Gregory, Christoph Seiter, and Hartmut Kämpfner. Development, Integration and Test of a Transportable Adaptive Optical Ground Station. In *IEEE International Conference on Space Optical Systems and Applications*, 6 pages, 2015.
Christian Fuchs, Martin Brechtelsbauer, Joachim Horvath, Amita Shrestha, Florian Moll, Dirk Giggenbach, and Christopher Schmidt. DLR's Transportable Optical Ground Station. In *Applications of Lasers for Sensing and Free Space Communications (OSA Technical Digest)*, 3 pages, 2013.
Christian Fuchs, Sylvain Poulenard, Nicolas Perlot, Jérôme Riedi, and Josep Perdigues. Optimization and throughput estimation of optical ground networks for LEO-downlinks, GEO-feeder links and GEO-relays. In Proc. of SPIE vol. 10096, Free-Space Laser Communication and Atmospheric Propagation XXIX, pp. 1009612-1-10, 2017.
Marco Reyes Garcia-Talavera, Zoran Sodnik, and Adolfo Comeron. Optical Ground Station: Requirements and Design, Bidirectional Link Model and Performance. In Near-Earth Laser Communications, chapter 9, pp. 272-318. CRC Press, 2009.
M. Gregory, D. Troendle, G. Muehlnikel, F. Heine, R. Meyer, M. Lutzer, and R. Czichy. 3 years coherent space to ground links: performance results and outlook for the optical ground station equipped with adaptive optics. In Proc. of SPIE vol. 8610, Free-Space Laser Communication and Atmospheric Propagation XXV, pp. 861004-1-13, 2013.
Frank Heine, Karen Saucke, Daniel Troendle, Matthias Motzigemba, Hermann Bischl, Dominique Elser, Christoph Marquardt, Hennes Henninger, Rolf Meyer, Ines Richter, and Zoran Sodnik. Laser based bi-directional Gbit ground links with the Tesat transportable adaptive optical ground station. In *Proc. of SPIE vol. 10096, Free-Space Laser Communication and Atmospheric Propagation XXIX*, pp. 100960Y-1-8, 2017.
Hamid Hemmati. Introduction. In *Near-Earth Laser Communications*, chapter 1, pp. 1-25. CRC Press, 2009.
Interagency Operations Advisory Group. Optical Link Study Group Final Report. Technical report, CNES, DLR, ESA, JAXA, KARI, NASA, 164 pages, Jun. 2012.
Erin Kahr, Oliver Montenbruck, and Kyle P. G. O'Keefe. Estimation and Analysis of Two-Line Elements for Small Satellites. Journal of Spacecraft and Rockets, 50(2):433-439, Mar.-Apr. 2013.
T. S. Kelso. Validation of SGP4 and IS-GPS-200D against GPS precision ephemerides. Advances in the Astronautical Sciences, 127:427-440, Jan.-Feb. 2007.
Ryan Kingsbury, Kathleen Riesing, and Kerri Cahoy. Design of a Free-Space Optical Communication Module for Small Satellites. In 28th Annual AIAA/USU Conference on Small Satellites, 10 pages, 2014.
Ryan Kingsbury. Optical Communications for Small Satellites. Ph.D. thesis, Massachusetts Institute of Technology, 124 pages, Aug. 2015.
Bryan Klofas and Jason Anderson. A Survey of CubeSat Communication Systems. In 10th Annual CubeSat Developers' Workshop, 25 pages, Apr. 2008.
Bryan Klofas. Upcoming Amateur Radio CubeSats: The Flood Has Arrived. In AMSAT-NA Symposium, 6 pages, Sep. 2013.
Bryan Klofas. High-Speed Radio Options CubeSat High-Speed Downlink Communications. In *11th Annual CubeSat Developers' Workshop*, 11 pages, Apr. 2014.

(56) References Cited

OTHER PUBLICATIONS

Scarlett Koller and Marissa Ruiz. Accurate Tracking of the International Space Station Using Low-Cost COTS Equipment. Technical report, Final Report, Course 16.622, Massachusetts Institute of Technology, 34 pages, May 2016.
Steven D Kramer. The Impact of Predictive Avoidance Restrictions on Astronomical Observatories. Technical report, Institute for Defense Analyses, Science & Technology Policy Institute, 84 pages, Nov. 2010.
F. Kurz, D. Rosenbaum, and J. Leitloff. A Real Time Camera System for Disaster and Traffic Monitoring. In International Conference on Sensors and Models in Photogrammetry and Remote Sensing, 6 pages, 2011.
Robert Laing, Marion Fisher, and Frank Gribbin. William Herschel Telescope: Telescope Control System User Manual. Technical report, Isaac Newton Group, Particle Physics and Astronomy Research Council, pp. 1-60, Jul. 2014.
Elizabeth Landau. OPALS Boosts Space-to-Ground Optical Communications Research. https://www.nasa.gov/mission_pages/station/research/news/opals_boosts_research, 20 pages, 2015, Accessed: Apr. 21, 2017.
American National Standard for Safe Use of Lasers. Technical report, Laser Institute of America, 182 pages, Mar. 2007.
Walter R. Leeb and Peter J. Winzer. Photodetectors and Receivers. In *Near-Earth Laser Communications*, chapter 7. CRC Press, pp. 189-236, 2009.
R. Link, M. E. Craddock, and R. J. Alliss. Mitigating the impact of clouds on optical communications. In *Proc. of IEEE Aerospace Conference*, pp. 1258-1265, 2005.
Daniel Patrick Luciani. System Design and Implementation of the Virginia Tech Optical Satellite Tracking Telescope System Design and Implementation of the Virginia Tech Optical Satellite. M.s. thesis, Virginia Polytechnic Institute and State University, 138 pages, Apr. 2016.
Jeffrey G. Mangum, Jacob W. M. Baars, Albert Greve, Robert Lucas, Ralph C. Snel, Patrick Wallace, and Mark Holdaway. Evaluation of the ALMA Prototype Antennas. Publications of the Astronomical Society of the Pacific, 118(847):1257-1301, Sep. 2006.
Robert G Marshalek. Pointing, Acquisition, and Tracking. In Near-Earth Laser Communications, chapter 3, pp. 59-94. CRC Press, 2009.
Meade. Instruction Manual: 8", 10", 12", 14", 16" LX200-ACF Advanced Coma-Free Telescopes with GPS and AutoStar II Hand Controller. Technical report, pp. 1-75, 2009.
Martin Mobberley. Astronomical Equipment for Amateurs. Springer-Verlag London Ltd., London, 268 pages, 1999.
Bruce Moision and Jon Hamkins. Coding and Modulation for Free-Space Optical Communications. In Near-Earth Laser Communications, chapter 6, pp. 161-185. CRC Press, 28 pages, 2009.
Florian Moll, Amita Shrestha, and Christian Fuchs. Ground stations for aeronautical and space laser communications at German Aerospace Center. In Proc. of SPIE vol. 9647, Advanced Free-Space Optical Communication Techniques and Applications, pp. 964701-1-11, 2015.
Ivan Muñoz M. The VLT Pointing Module. In Proc. of SPIE vol. 4009, Advanced Telescope and Instrumentation Control Software, pp. 300-307, 2000.
Daniel V. Murphy, Jan E. Kansky, Matthew E. Grein, Robert T. Schulein, Matthew M. Willis, and Robert E. Lafon. LLCD operations using the Lunar Lasercom Ground Terminal. In *Proc. of SPIE vol. 8971, Free-Space Laser Communication and Atmospheric Propagation XXVI*, pp. 89710V-1-7, 2014.
Tam Nguyen. *Laser Beacon Tracking for Free-space Optical Communication on Small-Satellite Platforms in Low-Earth Orbit*. S.M. thesis, Massachusetts Institute of Technology, pp. 1-94, Sep. 2015.
Sabino Piazzolla. Atmospheric Channel. In *Near-Earth Laser Communications*, chapter 8, CRC Press, pp. 237-269, 2009.

Kathleen Riesing. *Development of a Pointing, Acquisition, and Tracking system for a Nanosatellite optical communication module*. S.M. thesis, Massachusetts Institute of Technology, pp. 1-127, Sep. 2015.
Kathleen Riesing. Orbit Determination from Two Line Element Sets of ISS-Deployed CubeSats. In *Proceedings of 29th Annual AIAA/USU Conference on Small Satellites*, 9 pages, 2015.
Bryan S. Robinson, Andrew J. Kerman, Eric A. Dauler, Richard J. Barron, David O. Caplan, Mark L. Stevens, John J. Carney, Scott A. Hamilton, Joel K. W. Yang, and Karl K. Berggren. 781-Mbit/s photon-counting optical communications using a superconducting nanowire detector. *Optic Letters*, 31(4):444-446, Feb. 2006.
Jose Romba, Zoran Sodnik, Marcos Reyes, Angel Alonso, and Aneurin Bird. ESA's Bidirectional Space-to-Ground Laser Communication Experiments. In Proc. of SPIE vol. 5550, Free-Space Laser Communications IV, pp. 287-298, 2004.
Karen Saucke, Christoph Seiter, Frank Heine, Mark Gregory, Daniel Tröndle, Edgar Fischer, Thomas Berkefeld, Mikael Feriencik, Marco Feriencik, Ines Richter, and Rolf Meyer. The Tesat Transportable Adaptive Optical Ground Station. In *Proc. of SPIE vol. 9739, Free-Space Laser Communication and Atmospheric Propagation XXVIII*, pp. 973906-1-11, 2016.
Christopher Schmidt, Martin Brechtelsba, Rein Fabian, and Fuchs Christian. OSIRIS Payload for DLR's BiROS Satellite. In *International Conference on Space Optical Systems and Applications*, 7 pages, 2014.
A. Shrestha and M. Brechtelsbauer. Transportable optical ground station for high-speed free-space laser communication. In *Proc. of SPIE vol. 8517, Laser Communication and Propagation through the Atmosphere and Oceans*, pp. 851706-1-9, 2012.
M. D. Shuster and S. D. Oh. Three-axis attitude determination from vector observations. Journal of Guidance and Control, 4(1):70-77, Jan.-Feb. 1981.
Zoran Sodnik, Bernhard Furch, and Hanspeter Lutz. The ESA Optical Ground Station: Ten Years Since First Light. Technical report, pp. 35-40, Nov. 2007.
Zoran Sodnik, Josep Perdigues Armengol, Reinhard H. Czichy, and Rolf Meyer. Adaptive Optics and ESA's Optical Ground Station. In Proc. of SPIE vol. 7464, Free-Space Laser Communications IX, pp. 746406-1-9, 2009.
Zoran Sodnik, Hans Smit, Marc Sans, Igor Zayer, Marco Lanucara, Iciar Montilla, and Angel Alonso. LLCD operations using the Lunar Lasercom OGS Terminal. In Proc. of SPIE vol. 8971, Free-Space Laser Communication and Atmospheric Propagation XXVI, pp. 89710W-1-13, 2014.
Software Bisque. TheSkyX Professional Edition. http://www.bisque.com/sc/pages/TheSkyX-Professional-Edition.aspx, 3 pages, 2017. Accessed: Apr. 21, 2017.
J. O. Straede and P. T. Wallace. The Anglo-Australian 3.9-meter Telescope: Software Controlled Slewing, Setting, and Tracking. *Publications of the Astronomical Society of the Pacific*, 88:792-802, Oct. 1976.
Paul Sydney, John Africano, Amy Fredericks, Kris Hamada, Vicki SooHoo, Daron Nishimoto, Paul Kervin, Steve Bisque, and Matthew Bisque. Raven automated small telescope systems. In *Proc. SPIE vol. 4091, Imaging Technology and Telescopes*, pp. 237-247, 2000.
David L. Terrett. Tcl as a software environment for a TCS. In *Proc. of SPIE vol. 4848, Advanced Telescope and Instrumentation Control Software II*, pp. 251-260, 2002.
David L. Terrett. A C++ class library for telescope pointing. In Proc. of SPIE vol. 6274, Advanced Software and Control for Astronomy, pp. 627412-1-10, 2006.
U.S. Navy. Naval Observatory Vector Astrometry Software (NOVAS) Version 3.1 Fortran, C, and Python Editions. http://aa.usno.navy.mil/software/novas/novas_info.php, 1 page, 2015. Accessed: Apr. 21, 2017.
Benjamin Visser, Chris Sabol, and Scott Dahlke. Geosynchronous Orbit Determination Using High Accuracy Angular Observations. Advances in the Astronautical Sciences, 120, 17 pages, 2005.
Patrick Wallace. Pointing and Tracking Algorithms for the Keck 10-Meter Telescope. In Proc. of the Ninth Santa Cruz Summer Workshop in Astronomy and Astrophysics, Instrumentation for

(56) References Cited

OTHER PUBLICATIONS

Ground-Based Optical Astronomy, Present and Future, pp. 691-707. Springer-Verlag New York Inc., 1988.

Patrick Wallace. TPOINT—Telescope Pointing Analysis System (v4.4), 51 pages, Dec. 1994.

Patrick Wallace. Pointing and tracking software for the Gemini 8-metre telescopes. In Proc. of SPIE vol. 2871, pp. 1020-1031, 1997.

Patrick Wallace. A rigorous algorithm for telescope pointing. In Proc. of SPIE vol. 4848, Advanced Telescope and Instrumentation Control Software II, pp. 125-136, 2002.

Patrick T. Wallace. SLALIB—Positional Astronomy Library: 2.5-3 Programmer's Manual. http://star-www.rl.ac.uk/docs/sun67.htx/sun67.html, 6 pages, 2005. Accessed: Apr. 21, 2017.

Patrick T. Wallace. Concise telescope pointing algorithm using IAU 2000 precepts. In Proc. of SPIE vol. 7019, Advanced Software and Control for Astronomy II, pp. 701908-1-12, 2008.

Patrick T. Wallace. Telescope Pointing. http://www.tpointsw.uk/pointing.htm, 12 pages, 2017. Accessed: Apr. 21, 2017.

M. Warner, R. Cantarutti, G. Schumacher, E. Mondaca, O. Estay, M. Martinez, V. Aguirre, R. Alvarez, R. Leiva, T. M. C. Abbott, and N. S. Van Der Bliek. A modern approach to upgrading the Telescope Control System of the CTIO Blanco 4-m telescope. In *Proc. of SPIE vol. 8451, Software and Cyberinfrastructure for Astronomy II*, pp. 84510U-1-9, 2012.

Keith E. Wilson, Mike Britcliffe, and Nassar Golshan. Progress in design and construction of the Optical Communications Telescope Laboratory ( OCTL ). In *Proc. of SPIE vol. 3932, Free-Space Laser Communication Technologies XII*, pp. 112-116, 2000.

Keith E. Wilson, Joseph Kovalik, Abhijit Biswas, Malcolm Wright, William T. Roberts, Yoshihisa Takayama, and Shiro Yamakawa. Preliminary results of the OCTL to OICETS optical link experiment (OTOOLE). In Proc. of SPIE vol. 7587, Free-Space Laser Communication Technologies XXII, pp. 758703-1-758703-13, 2010.

Keith E. Wilson, D. Antsos, L. C. Roberts Jr., S. Piazzolla, L. P. Clare, and A. P. Croonquist. Development of the Optical Communications Telescope Laboratory: A Laser Communications Relay Demonstration Ground Station. In International Conference on Space Optical Systems and Applications, 6 pages, 2012.

Gary S. Wojcik, Heather L. Szymczak, Randall J. Alliss, Robert P. Link, Mary Ellen Craddock, and Michael L. Mason. Deep-space to ground laser communications in a cloudy world. In Proc. of SPIE vol. 5892, Free-Space Laser Communications V, pp. 589203-1-589203-11, 2005.

Malcolm W. Wright, Joseph Kovalik, Jeff Morris, Matthew Abrahamson, and Abhijit Biswas. LEO-to-ground optical communications link using adaptive optics correction on the OPALS downlink. In Proc. of SPIE vol. 9739, Free-Space Laser Communication and Atmospheric Propagation XXVIII, pp. 973904-1-10, 2016.

Hyosang Yoon, Kathleen Riesing, and Kerri Cahoy. Satellite Tracking System using Amateur Telescope and Star Camera for Portable Optical Ground Station. In 30th Annual AIAA/USU Conference on Small Satellites, pp. SSC16-VII-4, Logan, UT, 2016.

International Search Report and Written Opinion dated Sep. 20, 2017 from International Application No. PCT/US17/37885, 8 pages.

\* cited by examiner

SATELLITE TRACKING WITH A PORTABLE TELESCOPE AND STAR CAMERA

CROSS-REFERENCE TO RELATED APPLICATION(S)

This application claims the priority benefit of U.S. Application No. 62/350,884, which was filed on Jun. 16, 2016, and is incorporated herein by reference in its entirety.

GOVERNMENT SUPPORT

This invention was made with Government support under Grant No. NNX14AL61H awarded by the National Aeronautics and Space Administration. The Government has certain rights in the invention.

BACKGROUND

In the last few decades, space-based laser communications (lasercom) has emerged as a transformative technology for scientific, defense, and commercial spacecraft applications. Compared with traditional radio frequency (RF) communications, lasercom offers higher bandwidth, reduced size and mass of transceivers, and lower power consumption. Lasercom also avoids the significant regulatory hurdles of radio frequency allocation and provides better link security with narrow beams. As spacecraft generate increasing amounts of data, space-to-ground lasercom can provide high rate downlink capability to overcome a communications bottleneck.

Small satellites in particular have great potential to benefit from lasercom as they are significantly constrained in size, weight, and power. The small satellite market is currently experiencing a period of rapid growth. Despite launch delays, thousands of small satellites are expected to launch in the next five years.

FIG. 1 shows actual and project small satellite launches from 2010 through 2022. Despite launch delays, the market continues on an upward trend.

As the number of satellites in orbit grows and their capabilities improve, the amount of data they generate puts pressure on existing RF communications infrastructure, particularly as low latency downlink is a priority for many satellite operators. The communications subsystem continues to be a limitation for small satellites. The time required to license a portion of the RF spectrum often takes longer than the entire time to design, build, and test the satellite. The amateur band is becoming overcrowded with small satellites and licensing organizations such as the Federal Communications Commission are straining to keep up with increased demand.

The shortwave infrared spectrum utilized in lasercom has few regulations. Unlike RF, the lasercom spectrum does not require official allocation due to its narrow beamwidths that present little risk of interference. As of this writing, the only restrictions for lasercom frequencies are focused on eye safety and interference. The American National Standards Institute provides a metric for the maximum permissible exposure (MPE), which limits the power flux (in $W/cm^2$) of the signal and is dependent on wavelength. For lasercom downlinks, transmitted power is spread out over a large area and does not approach the MPE limit. Lasers directed upwards are controlled by the Department of Defense Laser Clearinghouse (LCH), which provides guidelines on reporting laser use to protect DOD assets. Safety limits must be considered on uplink since the power is concentrated on the ground. Careful design and precautionary measures such as airplane spotters can avoid safety concerns.

Lasercom Ground Stations for Satellite Communications

Existing lasercom ground stations are limited in number and are typically built into locations with existing infrastructure, such as astronomical observatories. A major challenge for lasercom ground stations are the limitations imposed by weather. A cloud-free line of sight between the space and ground terminals is required, which reduces the availability of individual sites. Diversity in the locations of ground stations is essential for link availability.

The initial investment cost can be high for optical ground stations, ranging from $1-5 million for a low-Earth orbit (LEO) to ground link. The initial investment cost makes development of a diverse ground network challenging. While pay-by-the-minute ground networks exist over RF, no similar option exists for lasercom. RF antennas can be purchased off-the-shelf, but the precision pointing required of optical ground stations requires a more custom solution.

Telescope and Site Selection

A fundamental design parameter of the ground station is the telescope diameter. A larger telescope collects more photons, but the desirability of a large aperture also depends on modulation scheme. The most common scheme is intensity modulation, which carries information based on the presence or absence of photons at a given time. However, some lasercom missions utilize coherent communication, in which case the phase of the incoming signal must also be recovered.

In the case of incoherent (i.e., direct) detection, the diameter of the telescope is selected based on the required power at the receiver. The diameter of the telescope goes into the link budget along with other parameters including transmitter power, path length, and beam divergence. It may be advantageous to split the collection area into several smaller telescopes, which can avoid the challenges of constructing a single large telescope. However, this presents its own challenges regarding alignment and the coupling of signal among multiple telescopes. Regardless of the specific implementation, a design driver of these systems is to provide enough aperture to meet a desired link margin.

The desired aperture size of a coherent ground station is somewhat more complicated due to atmospheric effects. In this case, there are two possible paths based on the Fried parameter, $r_0$. The Fried parameter has units of length and is defined as the diameter of a circular area over which the RMS wavefront aberration after passing through the atmosphere is 1 radian. For practical purposes, the Fried parameter is the diameter at which a diffraction-limited telescope has approximately the same resolution with or without turbulence. For a telescope with a diameter D where $D/r_0 \gg 1$, the atmosphere causes significant spreading of the signal in the focal plane. A telescope with $D/r_0 \ll 1$ will be diffraction-limited based on the aperture size.

The Fried parameter depends on location and time of day, but can be on the order of 10 cm at an astronomical observatory under favorable conditions at a wavelength of 500 nm. For coherent ground stations, either the aperture should be reduced below the Fried parameter or adaptive optics should be used to compensate for atmospheric turbulence. Constraining the aperture presents challenges in the link budget, so generally adaptive optics are preferable despite the additional complexity.

The location of the ground station is driven primarily by weather. Optical ground stations have many characteristics in common with astronomical observatories and are sometimes co-located. Desirable characteristics include high altitude, low humidity, few clouds, and low-strength turbulence. An additional consideration is spacecraft visibility, which could be a limitation for locations at extreme latitudes.

Pointing, Acquisition, and Tracking

Lasercom systems align the optical line of sight very precisely. Existing systems have error as small as submicroradians. For a ground station, this can be accomplished by steering the telescope alone and using a fine pointing stage. The signal is initially acquired with coarse sensors and open-loop pointing of the telescope. The stages of control are coordinated for handoff such that the coarse stage can maintain the signal within the range of the fine stage.

Prior to tracking a satellite, the ground station is aligned and calibrated. A pointing model accounts for the orientation of the telescope/mount assembly in inertial coordinates. This model can also account for mechanical properties of the telescope and common sources of error. The pointing model is generated by taking observations of known celestial objects.

FIG. 2 shows a process 200 of pointing, acquisition, and tracking for a typical lasercom terminal. The process 200 begins with open-loop initial pointing of the ground station telescope towards the satellite and/or vice versa (step 202), followed by open-loop coarse scan and detection of the satellite by the ground station and/or vice versa (step 204). In response to successful detection of the satellite, the ground and space terminals switch to closed-loop fine sensing and pointing (step 206). Once the ground and space terminals have locked onto each other, communications can begin, and the ground and space terminals continue with closed-loop fine tracking and link maintenance (step 208) until communications end.

In the process 200 of FIG. 2, the ground (space) terminal is closed-loop tracking the signal from the opposing space (ground) terminal. For satellite-to-ground communications, the initial satellite pointing error is usually larger than the downlink beamwidth. The ground station and spacecraft go through an acquisition procedure to make sure each terminal can see the other.

The majority of space lasercom terminals use beacon tracking to locate the ground station. In this approach, the ground station sends up a wide beam towards the spacecraft. The spacecraft sees this signal and corrects its pointing error so that the ground station is illuminated with the downlink. While beaconless tracking reduces system complexity and is particularly appealing for deep space lasercom, it is challenging to implement in practice. Without a beacon, the satellite must point within the accuracy of the downlink beamwidth without receiving any feedback from the ground station. Regardless of the use of a beacon uplink, the ground station typically closed-loop tracks the downlink.

FIGS. 3A-3C show the pointing, acquisition, and tracking sequence for a lasercom link between a ground station 310 and a satellite 320. From the perspective of the ground station 310, the sequence begins with initial pointing of a beacon 312 towards the expected location of the spacecraft 320 as shown in FIG. 3A. Orbital knowledge usually comes from GPS, radio ranging, or two-line element sets (TLEs) published by the Joint Space Operations Center (JSpOC), and any error in the spacecraft's position is translated into pointing error. The mispointing induced by position error gets worse the closer the spacecraft is to the ground station.

The ground station then enters the acquisition sequence (FIG. 3B). The ground station 310 open-loop tracks the expected trajectory of the spacecraft 320 and can perform a scan until a signal is seen. Coarse sensors with a wide field of view (FOV) 322, such as cameras, are used in the acquisition phase. Once the downlink signal has been detected, the ground station 310 can close its tracking loop and transition to using its fine pointing stage. When the ground station is fine tracking onto its receiver, the satellite 320 can transmits an optical signal beam 324 as shown in FIG. 3C.

For bidirectional systems, the final step is link maintenance which is conducted throughout communications. The purpose of link maintenance is to ensure transmit/receive (Tx/Rx) path alignment. This can be done by slightly adjusting pointing angle and applying a correction based on received power at the opposing terminal. Alternatively, the system can be designed with self-test capabilities through the use of optical elements to redirect transmitted signal into the receive path for alignment.

Instrumentation

In operation, the ground station collects signal onto the receiver. The design of the ground station optical assembly may be mission-specific, but there are key components that ground stations have in common. These generally include an acquisition sensor, a fine pointing sensor, a fine pointing actuator, a beacon, and a receiver. In the case of coherent lasercom, a wavefront sensor and corrective actuator may also be used.

The choice of receiver architecture drives the design of the optical assembly. The three general architectures are direct detection without preamplification, direct detection with preamplification, and coherent detection. The most common receiver choice is direct detection with a photodiode. Avalanche photodiodes (APDs) can have sensitivities in the photon-counting regime. High photodiode bandwidth typically requires low capacitance, which in turn limits the maximum detector area. This presents a challenge for the ground station to collect signal onto a receiver with a diameter of 200 microns or less. The size of the APD is a design trade for the system.

Coherent receivers necessitate adaptive optical elements as well as a local oscillator. For direct detection, optical preamplifiers, such as those in terrestrial fiber systems, can greatly improve the sensitivity of receivers. However, this involves coupling of the signal into a single-mode fiber with a diameter of around 9 microns. This again calls for adaptive optics to correct spreading of the signal due to atmospheric turbulence.

Apart from the receiver, the ground station instrumentation includes sensors and actuators to assist with pointing, acquisition, and tracking. Some ground stations have multiple levels of coarse sensors and actuators to achieve the desired pointing accuracy. The acquisition sensor is commonly a focal plane array or a quadrant detector with a wide FOV. This sensor is used to spot the signal and steer it into the FOV of the fine sensor. The fine sensor is also usually a focal plane array or quad detector with a narrow FOV. A fast-steering mirror (FSM) is most commonly used for precise tracking. An FSM is a flat tip/tilt mirror with bandwith in the hundreds or thousands of Hertz. An alternative approach uses a nutation element on the receive fiber paired with a photodiode to measure received power and adjust the fiber line of sight.

Challenges for Optical Ground Stations

Atmospheric Effects

The twinkling of stars at night is a well-known example of how light is distorted as it propagates through the atmosphere. To establish an optical link, a clear line-of-sight is desired between both terminals. The severity of atmospheric effects ranges from complete link unavailability, as in the case of cloud cover, to milder effects that can be addressed in the design of the terminal.

To ensure link availability, a diverse ground station network can overcome issues of cloud cover. At a given time, single-site availability may range from 60-80% while three or more sites can achieve over 90% availability. Transportable ground stations can mitigate the effects of seasons and enable dynamically deployed networks.

Beyond cloud cover, the lasercom terminal should be designed to handle general atmospheric conditions. Three atmospheric effects on beam propagation are absorption, scattering, and refractive-index fluctuations. Absorption and scattering tend to cause signal attenuation, while refractive-index fluctuations (i.e., turbulence) tend to cause irradiance fluctuation and loss of spatial coherence.

The atmosphere has different effects on downlinks and uplinks. In downlinks, the atmosphere is close to the receiver, whereas in uplinks the signal passes through the atmosphere immediately upon transmission. By the time the downlink reaches the atmosphere, it has spread out, so it tends to experience scintillation and changes in angle-of-arrival. The downlink scintillation benefits from an aperture-averaging effect. The uplink experiences scintillation and a more severe beam wander. Since the beam has not spread out significantly as in the case of the downlink, the entire signal can be deflected, typically on the order of a few microradians. These atmospheric effects must be carefully considered in the link budget and the design of the pointing and tracking system.

Pointing, Acquisition and Tracking of Low Earth Orbit (LEO) Satellites

A particular challenge for optical ground stations is tracking LEO satellites. Ground station passes last less than 10 minutes, so the ground station must quickly acquire the downlink to maximize data transmission.

A common mount type for LEO tracking applications is the altazimuth mount. An altazimuth mount has one gimbal that provides 360-degree motion in azimuth and a second gimbal that provides 90-degree rotation in altitude (elevation). When trying to track through zenith with an altazimuth mount, a singularity occurs: at zenith, the azimuth should instantaneously rotate through 180 degrees. The result is that any satellite pass that approaches zenith produces very high slew rates in the azimuth axis. FIG. 4 shows the maximum azimuth rate as a function of satellite altitude and elevation. The lower the satellite altitude and the higher the elevation, the more challenging it is for the ground station to track the satellite.

This problem occurs in any two-axis mount. Equatorial mounts, which are a common choice for astronomical observatories, simply tilt this singularity to be aligned with the Earth's polar axis. Unfortunately for altazimuth mounts, zenith passes also correspond with the shortest link range and therefore the most favorable link conditions. Although high elevation passes are rare, the mount should be capable of fast slews to ensure the link can be maintained near the singularity.

Transportability

The transportability of an optical ground station presents several unique challenges as compared to fixed optical ground stations. It should be designed to be compact and easily stowed for transport. This is particularly taxing on the optical assembly. The sensors, actuators, and optical elements should be coupled into the optical path of the telescope. There are two approaches to this. The preferred but more costly approach is to implement Coudé path in which the signal of the telescope is directed to a fixed location below the assembly. A controlled laboratory space with an optical bench can be set up below the telescope. This is a common approach for fixed optical ground stations, but is not well-suited for transportability.

Instead, the optical assembly can be mounted directly to the telescope. Whereas a Coudé path provides as much space as desired for the optical assembly, weight and volume are important constraints for a transportable ground station. The optical assembly should have a small size so as not to imbalance the telescope, and it is desirable to minimize the number of optical elements.

Another challenge for transportable ground stations is the initial calibration and development of a pointing model. For fixed ground stations, the telescope calibration is done by sighting dozens of individual stars. This process is time-consuming but is very stable once it is complete. For transportable ground stations, the calibration should be conducted whenever the telescope is moved. It is therefore desirable to have this process be as rapid as possible.

Existing Optical Ground Stations

Fixed Existing Optical Ground Stations

This section focuses on two examples of fixed optical ground stations that have supported high-profile lasercom demonstrations. These are the European Space Agency's Optical Ground Station (ESA-OGS) and NASA JPL's Optical Communications Telescope Laboratory (OCTL).

FIG. 5 shows ESA-OGS, which is located at the Teide Observatory on Tenerife Island, Spain. ESA-OGS was constructed to support the Semiconductor-laser Inter-satellite Link Experiment (SILEX). Space-to-ground communication between the telecommunications satellite ARTEMIS and ESA-OGS was first established in 2001. ESA-OGS has been used extensively in support of lasercom missions including the Laser Utilizing Communications Equipment (LUCE) mission by the Japan Aerospace Exploration Agency (JAXA) launched in 2005 and the French Liaison Optique Laser Aéroportée (LOLA) aircraft-to-space link demonstrated in 2006. ESA-OGS was one of several optical ground stations utilized in the Lunar Laser Communications Demonstration (LLCD) in 2013, which established lasercom links between a lunar orbiter and Earth.

While ESA-OGS originally only supported lasercom links based on intensity modulation, such as on-off keying (OOK), it has been retrofitted with adaptive optics to correct atmospheric phase distortion. This allows for higher data rates using homodyne binary phase shift keying (BPSK) modulation, which is used by the next-generation lasercom terminals on the European Data Relay System (EDRS) currently being implemented.

FIG. 6 shows the full ESA-OGS telescope assembly. It has a 1-meter aperture in a Ritchey-Chrétien/Coudé configuration. The telescope is attached to an English equatorial mount. The telescope has a focal ratio of f/39, which corresponds with a field of view (FOV) of 2.3 mrad. The Coudé path leads to an enclosed laboratory below the telescope where a 5×2 m$^2$ optical bench contains the receive and transmit optics.

On the receive path, the light from the telescope is collimated and directed onto an FSM that provides steering corrections. A portion of the received signal can be directed onto a wavefront sensor. The remainder of the signal goes through a beamsplitter with a pass-through aperture at its center. This aperture is the size of the tracking sensor's FOV, so that if the signal is within the FOV it passes through; otherwise, the signal is directed to an acquisition sensor with a wider FOV. The signal passing through the beamsplitter is directed through an optical isolator for the transmit and receive beams. A final beamsplitter divides the signal between the tracking sensor and the receiver/analysis equipment.

The transmitter is a titanium-sapphire laser capable of providing 7 W output power at 847 nm, pumped by an argon laser. A second steering mirror is used for aligning the transmitted and received signals and implementing a point-ahead angle as needed. The transmitted signal goes through the optical isolator and couples into the path that the received signal follows.

During a communications pass, the telescope tracks the satellite position from known orbital information in an open-loop manner (blind pointing). The satellite scans a beacon over its cone of pointing uncertainty, and the ground station waits to see a signal on its acquisition sensor. Once the signal is seen, the fine pointing mirror steers the received signal onto the tracking sensor and the ground station initiates its beacon to point towards the satellite. If the fine pointing mirror approaches the edge of its range, it can offload to the telescope mount. When the ground station has locked on to the received signal, it maintains the signal within four pixels on a tracking sensor which acts as a quadrant detector. At this point, the ground station is ready to receive data.

FIG. 7 shows the NASA JPL Optical Communications Telescope Laboratory (OCTL), which was built starting in 1999 to support to support space-to-ground lasercom missions. OCTL is located at the Table Mountain Facility in the San Bernardino Mountains in southern California. OCTL conducted a 50 Mb/s space-to-ground link with JAXA's LUCE terminal in low Earth orbit (LEO) in 2009. It was used as one of the ground stations for LLCD to support lunar downlink rates up to 78 Mb/s. OCTL was also used for the Optical PAyload for Lasercomm Science (OPALS) mission which completed downlinks from the International Space Station (ISS) in 2014.

OCTL has a 1-meter telescope that is in a Coudé configuration and is attached to a high-speed altazimuth mount. The focal ratio of the telescope is f/76, corresponding with a diffraction-limited FOV of 500 µrad. Co-aligned with the main aperture is a 20 cm, f/7.5 Newtonian telescope used for acquisition. This telescope has a FOV of 5 mrad and is aligned to well within the FOV of the main telescope, ensuring a signal can be guided into the main telescope. Additionally, a CCD camera with a motorized zoom lens provides a coarse FOV of 34 degrees down to 1.7 degrees for use in coarse acquisition. Initial acquisition can be achieved with the wide FOV camera or the acquisition telescope, which provides feedback to bring the target within the FOV of the main telescope.

A mirror along the Coudé path can direct the signal to any of four different optical benches so that ongoing missions can coordinate time on the telescope. The optical assembly depends on the specific mission, but an FSM is generally used for fine pointing. For LLCD and OPALS, a monostatic configuration was used in which the transmitted signal goes out of the main telescope. The mount can slew up to 20 degrees/s in azimuth and 10 degrees/s in elevation, which enables tracking of LEO satellites.

Transportable Existing Optical Ground Stations

Existing transportable optical ground stations are described in this section. These include the NASA/MIT Lincoln Laboratory's Lunar Lasercom Ground Terminal (LLGT), the Transportable Optical Ground Station (TOGS) by the German Aerospace Center (DLR), and the Transportable Adaptive Optical Ground Station (TAOGS) by Tesat Spacecom.

LLGT was the primary ground terminal developed for LLCD. A 622 Mb/s link was established between a lasercom terminal on the Lunar Atmosphere and Dust Environment Explorer (LADEE) spacecraft and LLGT. The ground station was designed by MIT Lincoln Laboratory and located at the White Sands Missile Range in New Mexico for operations. The ground station was designed to be transportable so that it could be developed near MIT Lincoln Laboratory and then transported to the White Sands location.

FIG. 8 shows the telescope assembly, which is contained in a clamshell dome and the support equipment is housed in a converted 40 ft shipping container. The telescope assembly includes four 15 cm uplink telescopes and four 40 cm downlink telescopes on an altazimuth mount. Having multiple apertures is a simple way of scaling to a large combined aperture and it provides spatial diversity to mitigate atmospheric effects. Behind each telescope are an FSM and InGaAs focal plane array to allow independent tracking of the downlink with 25 Hz closed-loop bandwidth.

The uplink includes four 10 W optical transmitters with adjustable divergence angles. The downlink telescopes couple to multi-mode polarization-maintaining fiber which transfer the photons to photon-counting superconducting nanowire arrays. These exotic detectors have demonstrated efficiencies of 0.5 photons/bit and enable the success of LLCD establishing high-rate links at lunar distances.

At the start of a link, LLGT and the space terminal point at each other based on known ephemeris data. After the space terminal sees the ground signal, it corrects its pointing to be seen by LLGT. Both sides of the link then close in on their targets and initiate communication. This process usually lasted only a few seconds.

DLR developed a transportable ground station to enable near real-time data transfer from Earth-observing satellites and aircraft. The system was first tested as part of DLR's VABENE project, in which a 1 Gb/s link was established between TOGS and a Dornier 228-212 aircraft. TOGS has also been used to track OPALS on the ISS, and is the primary ground station for the OSIRIS payload on the BiROS satellite.

FIGS. 9A and 9B show TOGS in its deployed and folded configurations, respectively. TOGS has a deployable 60 cm telescope in a Ritchey-Chrétien-Cassegrain configuration. The telescope is supported by an altazimuth mount on a structure with four adjustable legs. The structure has a mass of about 500 kg. The legs can level the mount and compensate for rough terrain. The telescope and mount fold into a truck which provides a means of transportation as well as an operations enclosure. To enable rapid calibration, dual-antenna GPS gives initial position and heading information. The mount also contains a tip/tilt sensor.

The optical assembly is mounted behind the telescope. A wide FOV camera is co-aligned with the main aperture to provide coarse feedback. Signal from the telescope is directed by a beam splitter onto a tracking camera and receiver to enable fine pointing. A movable lens allows focus adjustment. When the target is seen as a centroid on the tracking camera, a correction can be applied to the mount. Two 1550 nm, 5 W beacons are co-aligned with the receive telescope to illuminate the target.

Tesat Spacecom demonstrated coherent intersatellite laser communications in 2008 between two LEO satellites, and a modified version of the lasercom terminal was placed at ESA's Tenerife facility to demonstrate space-to-ground coherent communications. A 5.6 Gb/s bidirectional link was established between a 6.5 cm ground aperture and a 12.4 cm LEO aperture during campaigns in both Tenerife and Hawaii. Because the lasercom terminal was designed for intersatellite links using BPSK modulation, the ground terminal size had to be reduced to 6.5 cm and placed at high altitudes to overcome atmospheric effects.

Without adaptive optics, the ground station is limited in terms of its aperture size, which in turn increases the power required to establish a link. To overcome this, Tesat began developing TAOGS in partnership with Synopta and DLR. TAOGS has demonstrated 5.6 Gb/s communications with LEO satellites and 2.8 Gb/s uncoded to geostationary (GEO) satellites. TAOGS includes an optics container and an operations container as shown in FIG. 10.

TAOGS has a receive aperture of 27 cm and a separate transmit beam that can be adjusted between 2, 3.5, and 9.5 cm. There are two pointing assemblies, one of which contains the receive aperture and can transmit at 2 and 3.5 cm. A separate assembly is transmitter-only at 3.5 and 9.5 cm. Both assemblies can be seen in FIG. 10. A calibration procedure with star sightings is used to align the main pointing assembly up to an accuracy of 50 μrad.

TAOGS uses a CMOS camera behind the telescope as an acquisition sensor. An FSM is used to provide fine steering. A 96-element Shack-Hartmann sensor is used to detect the wavefront which is paired with a 12×12 actuator MEMS deformable mirror to provide wavefront correction. A separate mirror is used to implement point-ahead on the transmitted signal.

TABLE 1 (below) summarizes some parameters of the optical ground stations discussed above. While the development costs of the stations discussed are not published, they can be estimated from an Interagency Operations Advisory Optical Link Study Group with participants from Centre National d'Études Spatiales (CNES), DLR, ESA, JAXA, Korea Aerospace Research Institute (KARI), and NASA. The group estimated the cost of potential 40 cm ground stations in diverse locations intended for use with LEO satellites. Initial costs ranged between $1-5 million per site. For a mass estimate, consider TOGS, which has a mass on the order of 500 kg excluding the support equipment.

TABLE 1

Summary of existing optical ground station parameters.

| Name/ Org. | Receive Aperture | Mount Type | f-ratio | Notes |
|---|---|---|---|---|
| OGS/ ESA | 1 m | English equatorial | f/39 | Open-loop pointing ± 50μ rad Fitted with adaptive optics |
| OCTL/ JPL | 1 m | Altazimuth | f/76 | Open-loop pointing ± 17μ rad Co-aligned 20 cm f/7.5 telescope for acquisition |
| LLGT/ MITLL | 4 × 40 cm | Altazimuth | — | Deployable from 40-ft container Superconducting nanowire receiver for lunar links |
| TOGS/ DLR | 60 cm | Altazimuth | f/2.5 | Deployable from truck Co-aligned wide FOV camera for acquisition |
| TAOGS/ Tesat | 27 cm | Altazimuth | — | Deployable from container Open-loop pointing ± 200μ rad |

Fitted with adaptive optics

SUMMARY

Embodiments of the present technology include a ground station for satellite lasercom with a cost of less than $25,000 and a mass of about 50 kg or less. This is approximately 100 times less expensive and 10 times less massive than state-of-the-art ground stations. This low-cost, portable optical ground station can help alleviate the problem of ground station availability. It can be relocated to avoid seasonal weather variation or even to target individual satellite orbits. By using low-cost, commercial-off-the-shelf technology, many stations can be deployed at the same cost of a single fixed site. A portable optical ground station can also make lasercom accessible to spacecraft operators who do not have an observatory-class facility.

Other embodiments of the present technology include methods of pointing a telescope mounted on a gimbal at a satellite. Examples of these methods may include acquiring a plurality of star camera images with a star camera affixed to the telescope at respective gimbal positions in a plurality of gimbal positions, with each star camera image at a different gimbal position. (The star camera can have a wider field of view than the telescope.) A processor coupled to the star camera and gimbals determines an alignment of the gimbal to an Earth-centered reference frame and an alignment of the star camera to the gimbal based on the star camera images and the gimbal positions. The processor can then command the gimbal to point the telescope at the satellite based on the alignment of the gimbal to the Earth-centered reference frame, the alignment of the star camera to the gimbal, and an alignment of the telescope to the star camera.

Acquiring the star camera images may include rotating the telescope and the star camera to a plurality of azimuth angles and a plurality of altitude angles with the gimbal. Acquiring the star camera images can occur quickly, e.g., within one hour.

In some cases, the processor determines the alignment of the gimbal to the Earth-centered reference frame and the alignment of the star camera to the gimbal by determining an alignment of the telescope to the gimbal based on the gimbal positions. The processor may also determine the alignment of the telescope to the star camera, e.g., by acquiring an image with an image sensor in optical communication with an eyepiece of the telescope and correlating the image to at least one of the star camera images.

The processor and gimbal may point the telescope at the satellite at a root-mean-square error of less than 180 arc-seconds. They may also cause the telescope to track the satellite. For instance, they may track the satellite by estimating a change in azimuth angle and/or altitude angle of the satellite based in part on the alignment of the gimbal to the Earth-centered reference frame and the alignment of the star camera to the gimbal.

Together, the telescope, gimbal, star camera, processor, and optional image sensor form a ground station that can weigh less than about 50 kilograms. The telescope can have a lens aperture of less than about 1 meter, and the gimbal can be a two-axis gimbal (e.g., an altazimuth gimbal). The ground station may also include one or more encoders that are operably coupled to the gimbal to measure change(s) in angle of the gimbal about different axes.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 12:
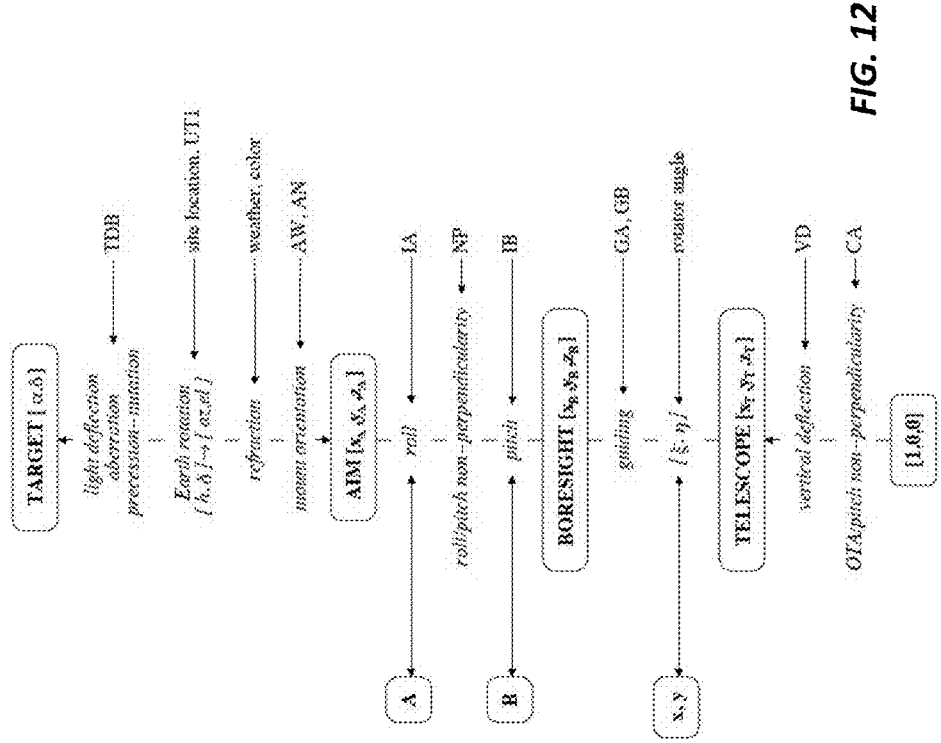

FIG. 12 illustrates the chain of pointing transformations in the pointing algorithm proposed in Patrick Wallace, "A rigorous algorithm for telescope pointing," in Proc. of SPIE Vol. 4848, Advanced Telescope and Instrumentation Control Software II, pages 125-136, 2002, which is incorporated herein by reference in its entirety. The boxes show vectors in intermediate frames while the italics show the transformations between vectors.

Figure 13:
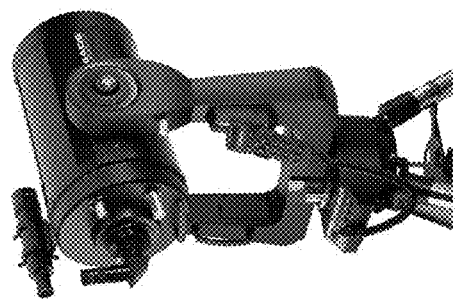

FIG. 13 shows a Meade LX200 amateur telescope with computerized align and track capability.

Figure 14:
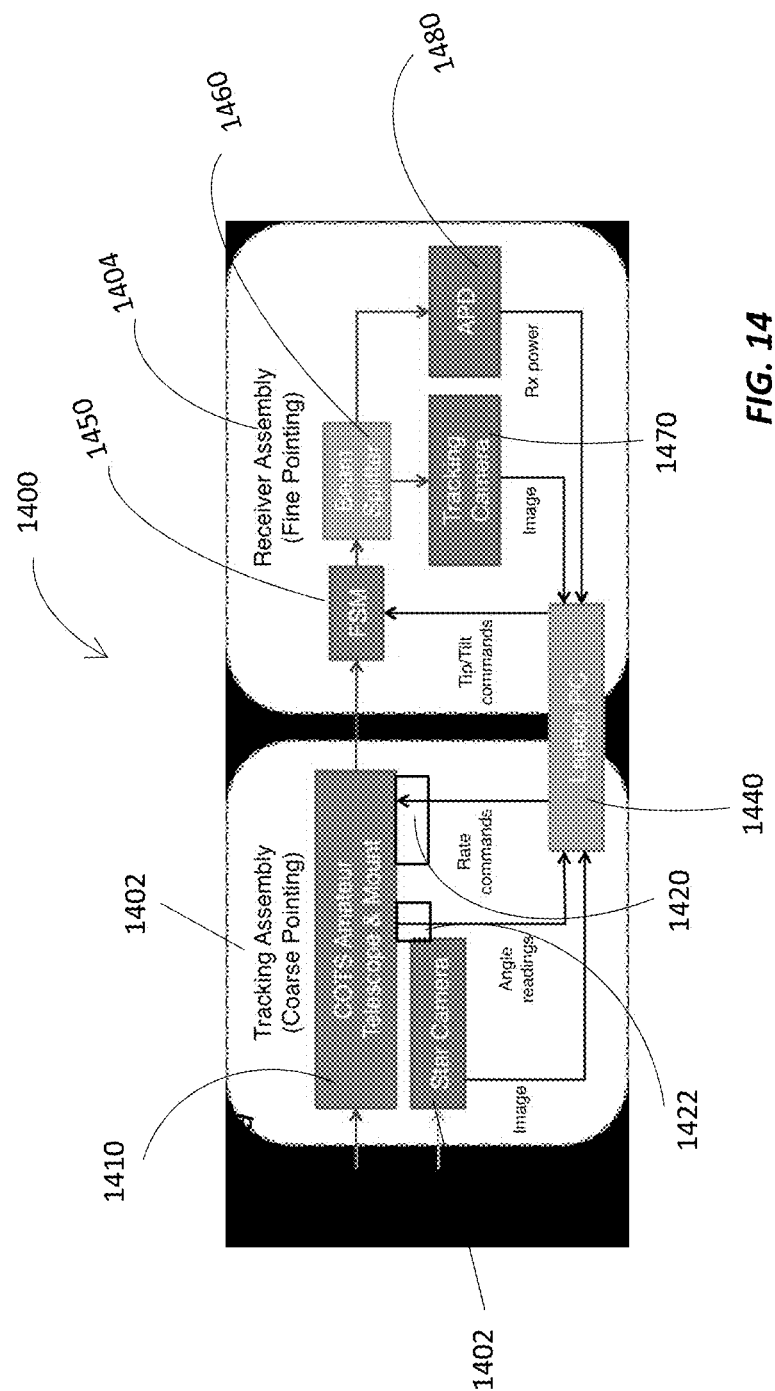

FIG. 14 is a block diagram of portable optical ground station.

Figure 15:
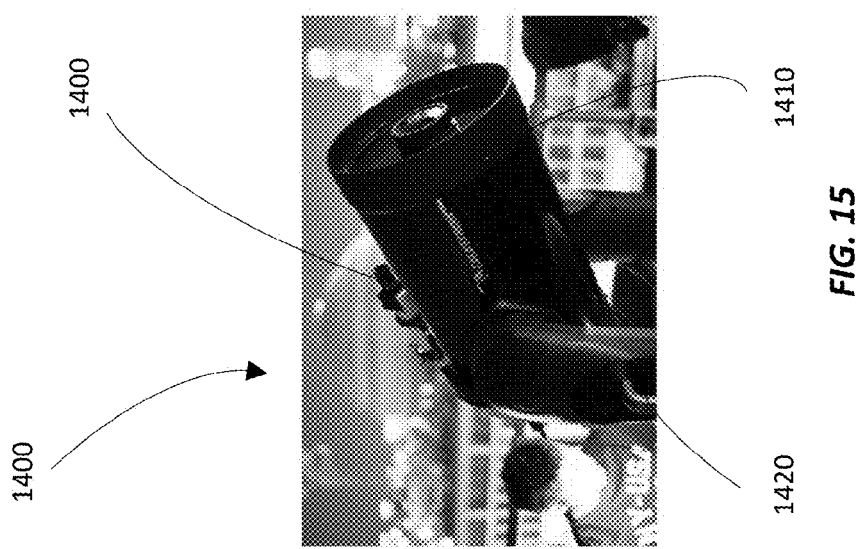

FIG. 15 shows a Celestron CPC1100 on the roof of MIT Building 37.

Figure 16:
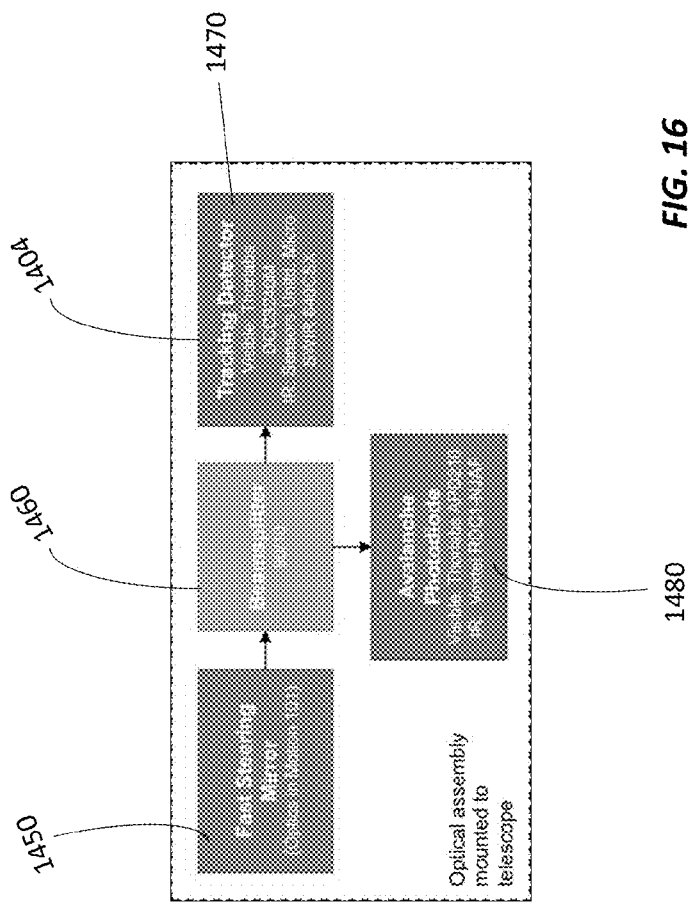

FIG. 16 is a block diagram of receiver assembly with identified hardware.

Figure 17:
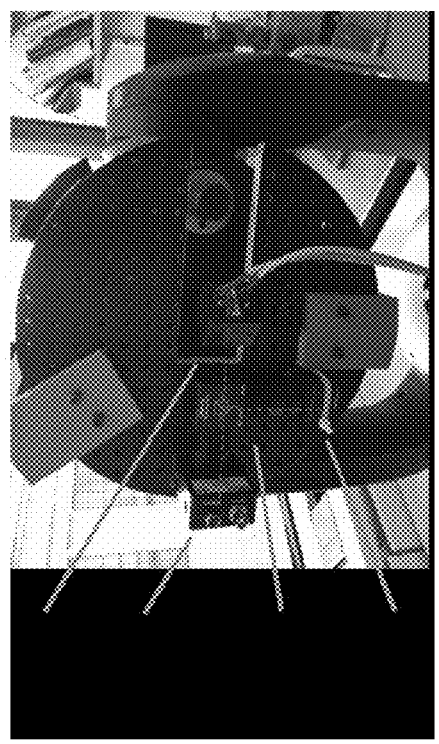

FIG. 17 shows a receiver assembly mounted behind telescope.

Figure 18A:
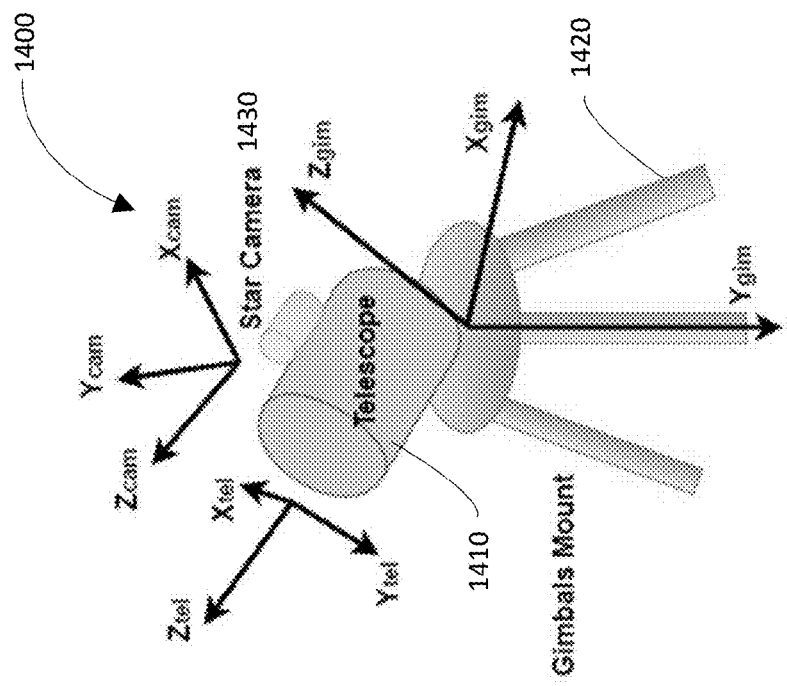

FIG. 18A shows axes for the camera frame of reference, telescope frame of reference, and gimbal mount frame of reference for a portable optical ground station.

Figure 18B:
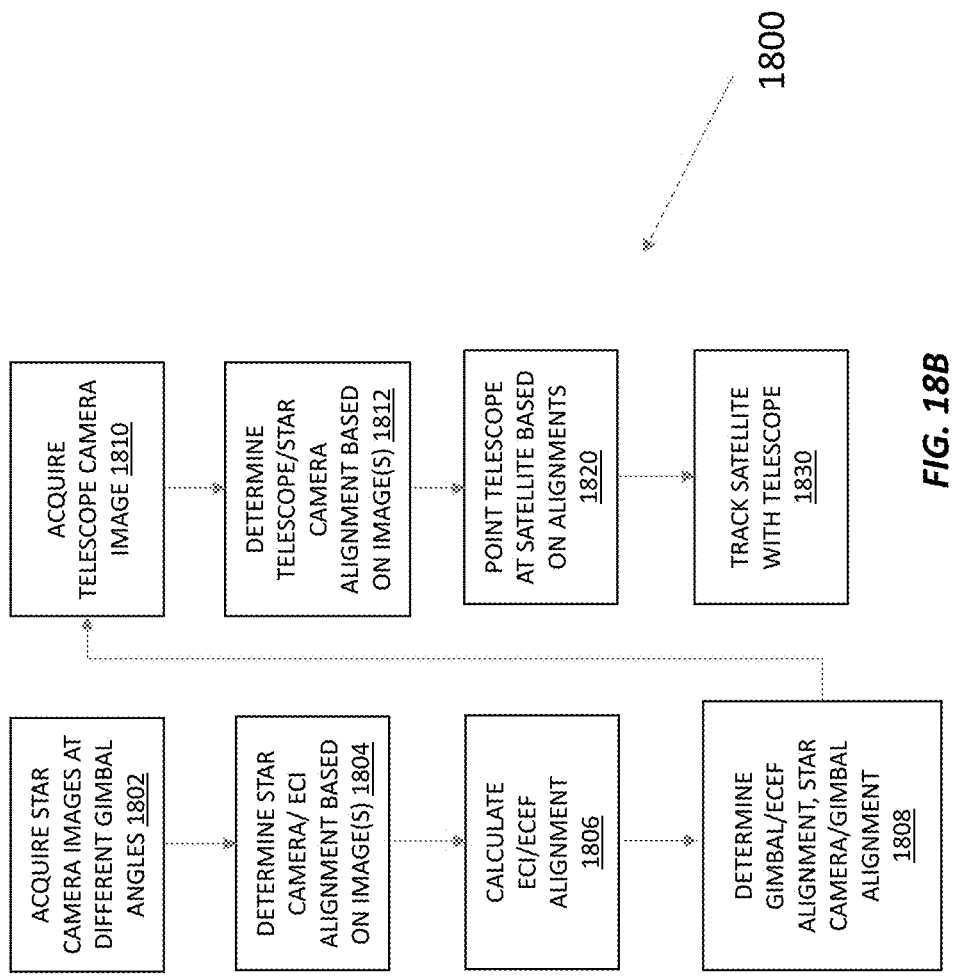

FIG. 18B illustrates a process for calibrating a portable ground station, pointing the portable ground station at a satellite, and tracking the satellite with the portable ground station.

A shows axes for the camera frame of reference, telescope frame of reference, and gimbal mount frame of reference for a portable optical ground station.

Figure 19:
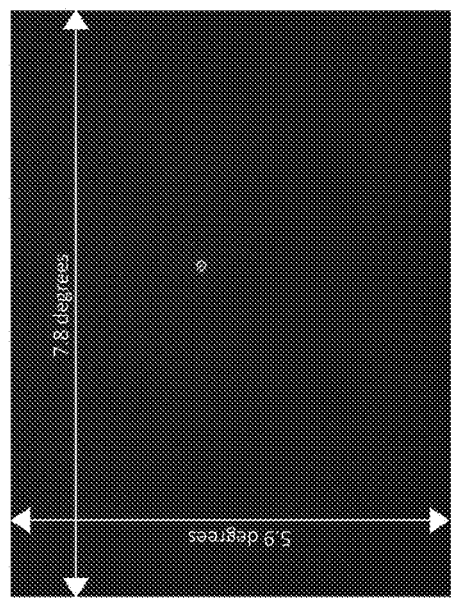

FIG. 19 shows the International Space Station (ISS) (inside the circle) as seen from the star tracker attached to the telescope.

Figure 20:
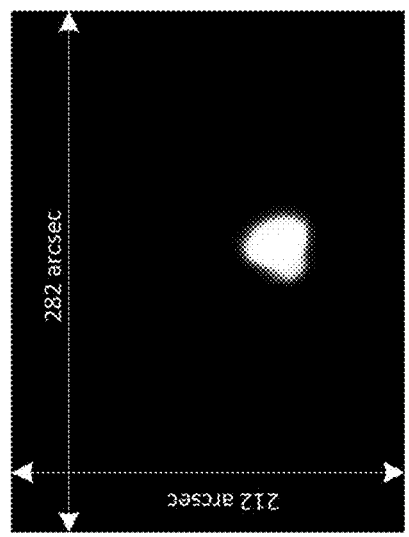

FIG. 20 shows the ISS as seen from the camera behind the telescope.

Figure 21:
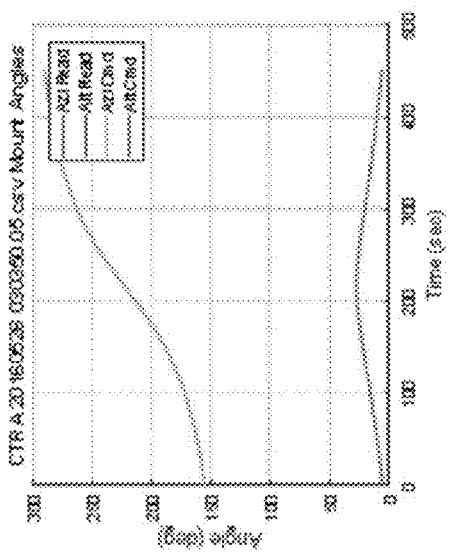

FIG. 21 shows the Azimuth/Altitude (Azi/Alt) angle profile for ISS tracking with a portable ground station.

Figure 22:
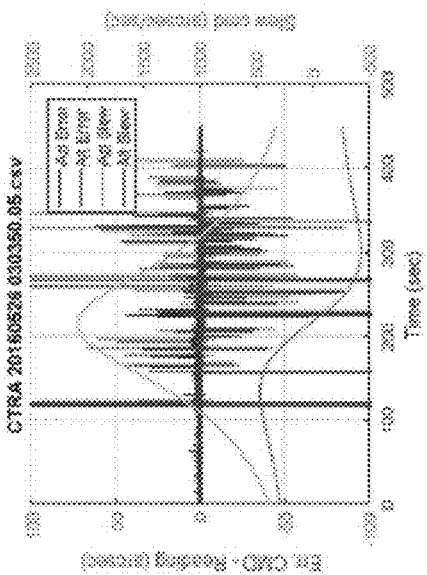

FIG. 22 shows Azi/Alt control error and slew rate commands.

Figure 23:
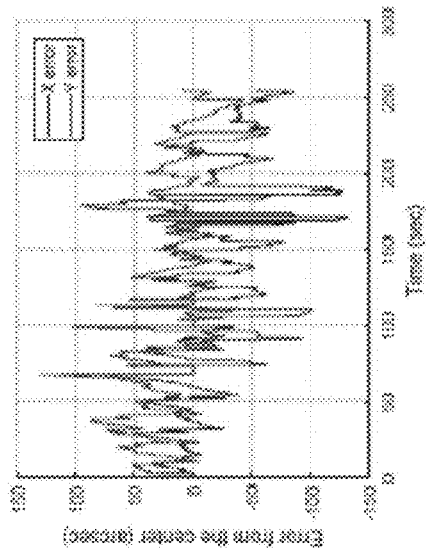

FIG. 23 shows ISS tracking error calculated from location on the eyepiece camera.

Figure 24:
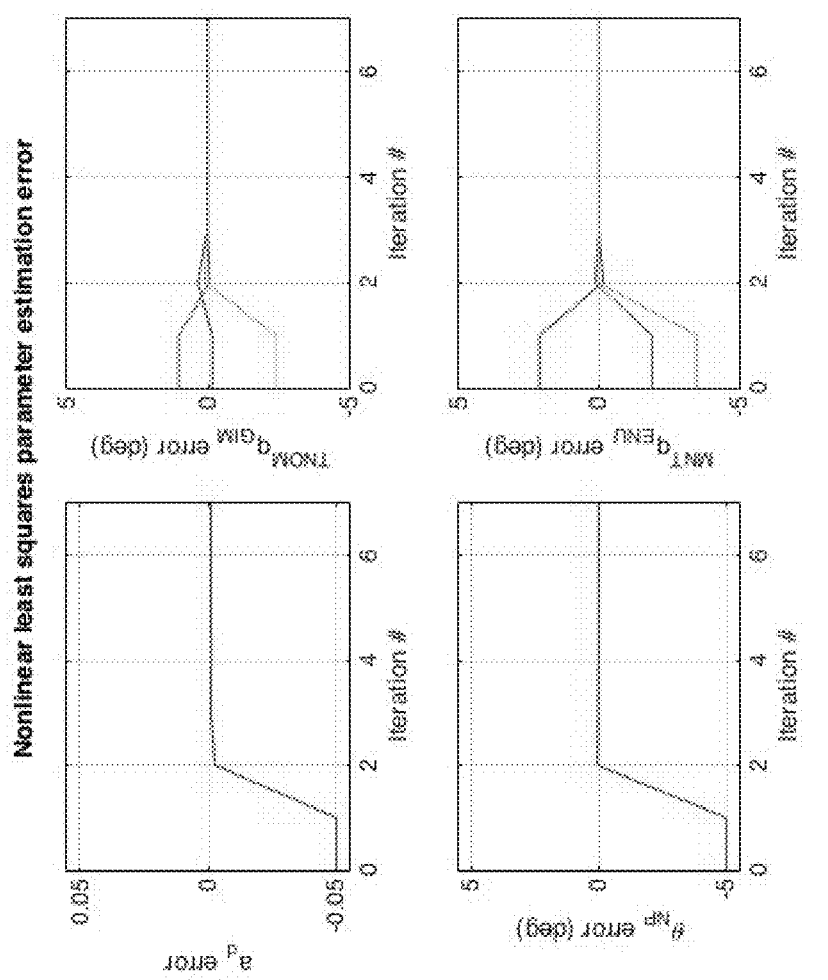

FIG. 24 shows plots of a simulated pointing model parameter estimation using nonlinear least squares.

Figure 25:
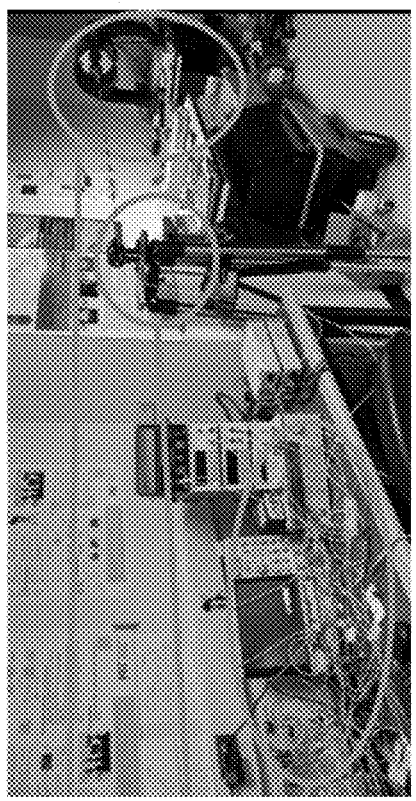

FIG. 25 shows an over-the-air test setup in the lab. The benchtop transmitter signal is launched into free space from a collimator which is picked up by the ground station assembly across the lab.

Figure 26:
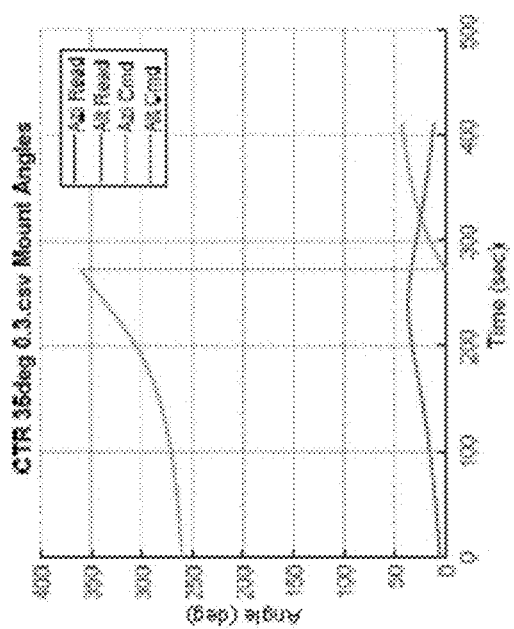

FIG. 26 shows Azi/Alt mount angles measured for a sample ISS tracking maneuver.

Figure 27:
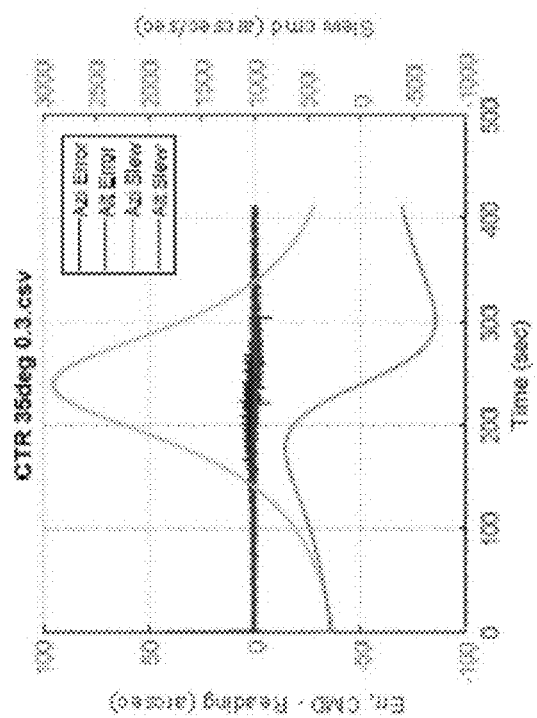

FIG. 27 shows Azi/Alt control error plotted with the slew rate commands.

DETAILED DESCRIPTION

The present technology uses an amateur telescope as a portable optical ground station for tracking and communicating with satellites and other spacecraft. Using an amateur telescope has the potential to reduce mass by a factor of ten, from hundreds of kilograms to tens of kilograms, and to reduce cost by a factor of one hundred, from millions of dollars to tens of thousands of dollars, compared to state-of-the-art optical ground stations disclosed above. This portable can be deployed rapidly (e.g., in an hour or less) to point within an accuracy of 100 arcseconds root-mean-square (RMS) error. This pointing error is small enough to track a satellite or other spacecraft in low Earth orbit (LEO).

This rapid deployment is enabled by a telescope calibration approach using a star camera attached to the telescope. The telescope calibration process requires little to minimal manual input and is agnostic to initial telescope orientation. Once the telescope establishes an optical communications link with the satellite, a tracking filter for precision satellite tracking considers errors in calibration and orbital elements. This satellite tracking filter combines orbital elements and telescope parameters into the state. As understood by those of skill in the art, the "state" or "state vector" is a term of art that refers to the vector with the components being estimated. Examples of state vectors include the telescope state vector (where the telescope is positioned and pointing) and the satellite state vector (where the satellite is positioned and pointing). s As discussed above, prior "transportable" ground stations that are documented in the literature are transportable via trucks or shipping containers. Conversely, the ground station disclosed here is "portable," meaning that it is compact enough to be moved and deployed by one or two people. Moreover, an example ground station Ground Station Pointing Telescope control can be split into two segments: "pointing" and "tracking." Pointing refers to the period before the target is acquired, while tracking describes the period after acquisition. This section describes how telescopes perform initial pointing.

To point a telescope towards a desired object, the coordinates of the object are generally necessary. Those coordinates are typically specified in an inertial frame such as the International Celestial Reference Frame (ICRF) adopted by the International Astronomical Union. There are several transformations that go into getting the appropriate target coordinates that include precession, nutation, aberration, sidereal time, and refraction through the atmosphere. Positional astronomy libraries such as SLALIB and NOVAS can assist with these transformations.

With target coordinates in an Earth-fixed inertial frame (e.g., right ascension and declination), the coordinates can be determined in a local horizontal frame (e.g., azimuth and elevation) by taking into account the location of the ground station, the rotation of the Earth, and the current time. If the telescope assembly were perfect, simply commanding the mount to the azimuth and elevation of the target would point the telescope at the target. However, the telescope assembly has imperfections such that the azimuth and elevation as read by the mount encoders is usually not exactly the true azimuth and elevation of the telescope boresight. The pointing model characterizes this difference. It determines what mount angles the telescope should be commanded to.

Figure 1:
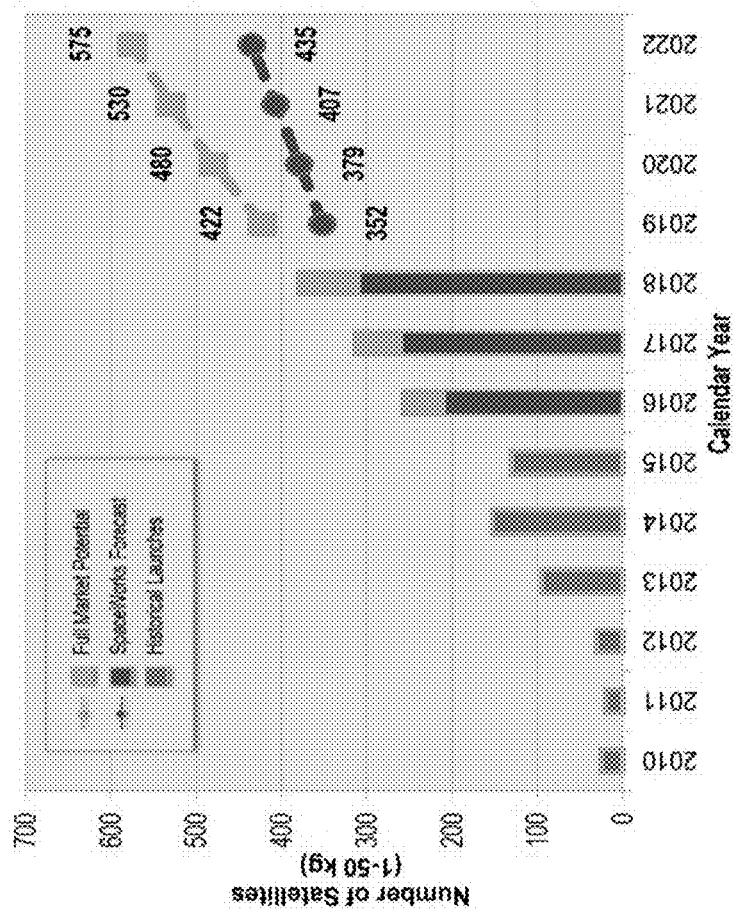
FIG. 1 shows actual and projected small satellite launches from 2010 through 2022.
Figure 2:
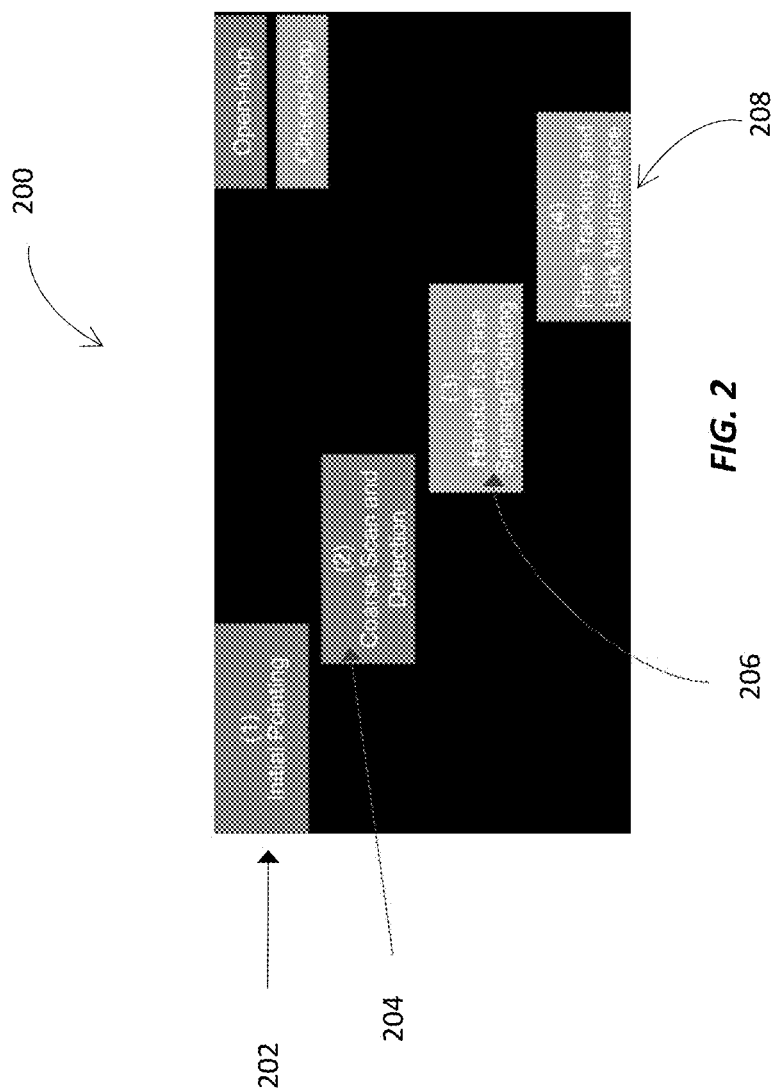
FIG. 2 shows pointing, acquisition, and tracking steps for a laser communications terminal.
Figure 3C:
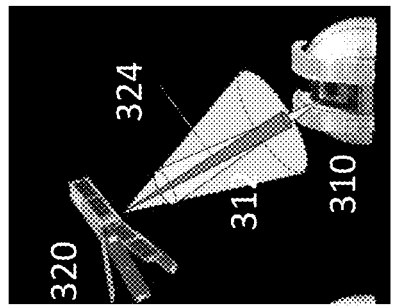
FIGS. 3A-3C illustrate pointing, acquisition, and tracking for satellite lasercom.
Figure 3B:
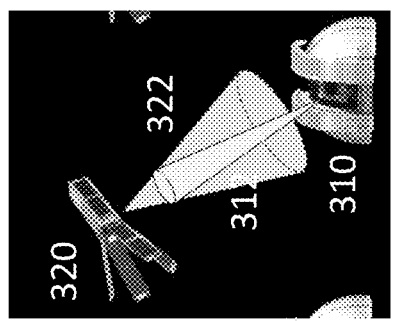
Figure 3A:
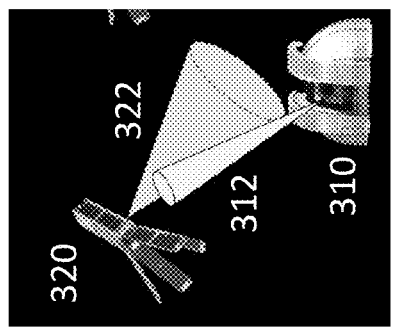
Figure 4:
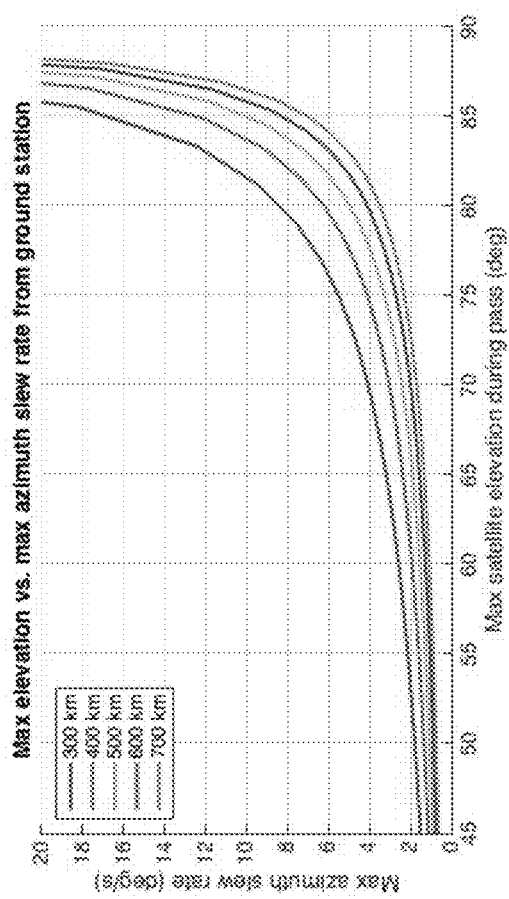
FIG. 4 is a plot of ground station slew rate as a function of satellite altitude and maximum elevation of pass. An altazimuth mount tracking near zenith results in very high azimuth rates.
Figure 5:
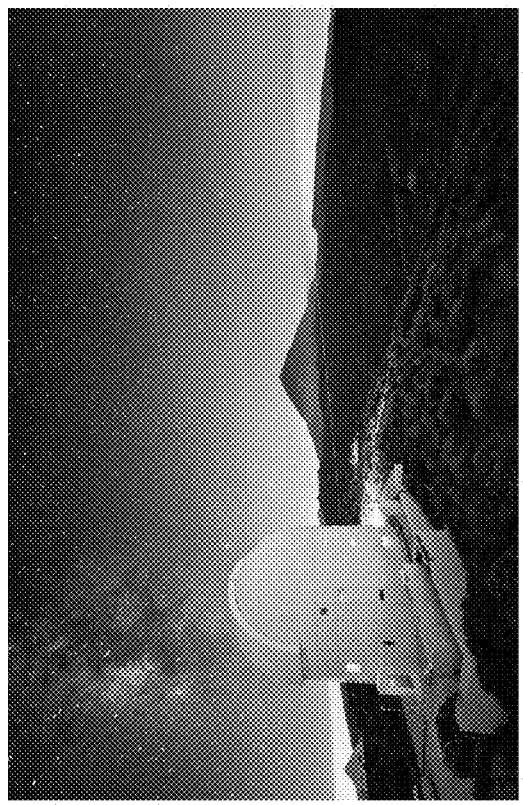
FIG. 5 shows the European Space Agency's Optical Ground Station (ESA-OGS) facility located at the Teide Observatory on Tenerife, Canary Islands, Spain.
Figure 6:
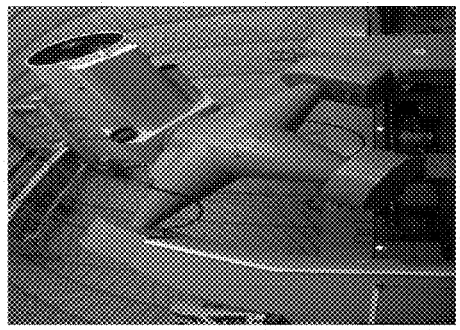
FIG. 6 shows the ESA-OGS 1-meter telescope on an English mount.
Figure 7:
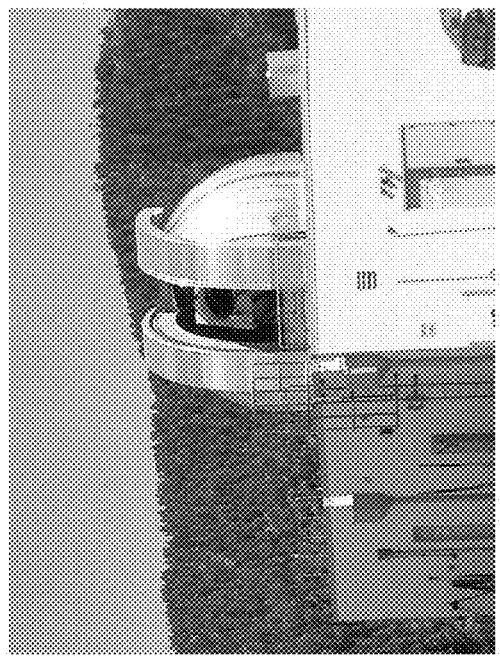
FIG. 7 shows NASA JPL's Optical Communications Telescope Laboratory at the Table Mountain Facility in southern California.
Figure 8:
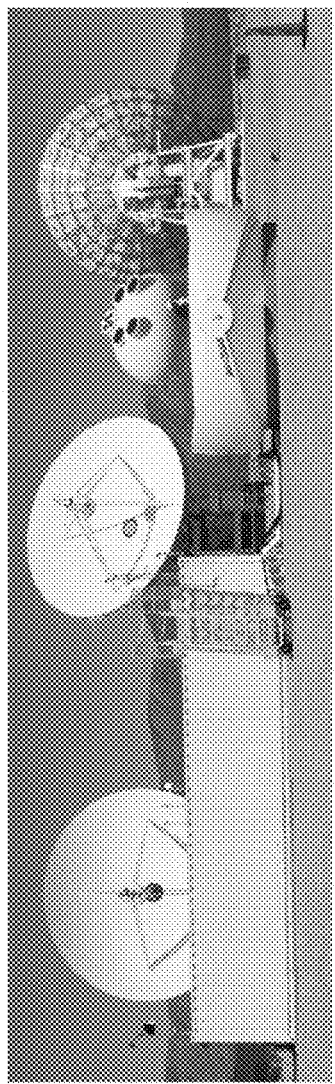
FIG. 8 shows NASA/MIT Lincoln Laboratory's Lunar Lasercom Ground Terminal pictured in White Sands, N. Mex.
Figure 9:
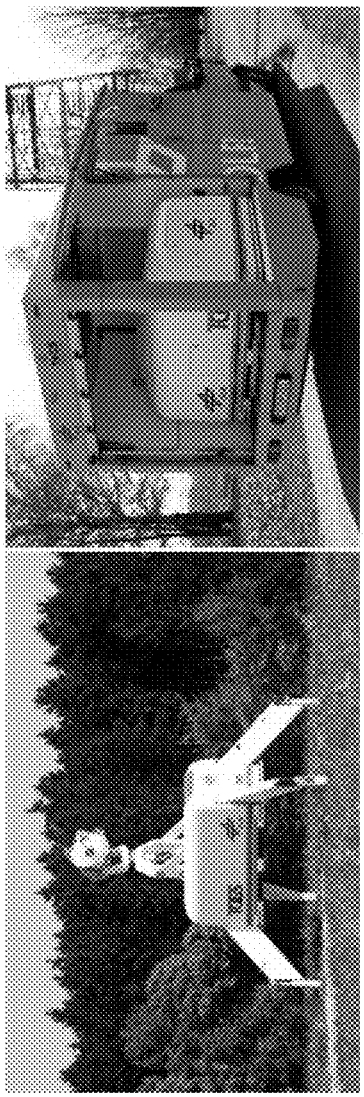
FIGS. 9A and 9B show the DLR's Transportable Optical Ground Station deployed for operations and folded into a truck for transport, respectively.
Figure 10:
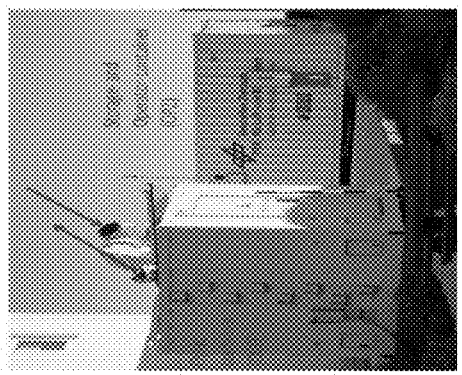
FIG. 10 shows Tesat Spacecom's Transportable Adaptive Optical Ground Station consisting of an optics container and storage container. Two pointing assemblies can be seen for receive (downward arrow) and transmit (upward arrow).
Figure 11:
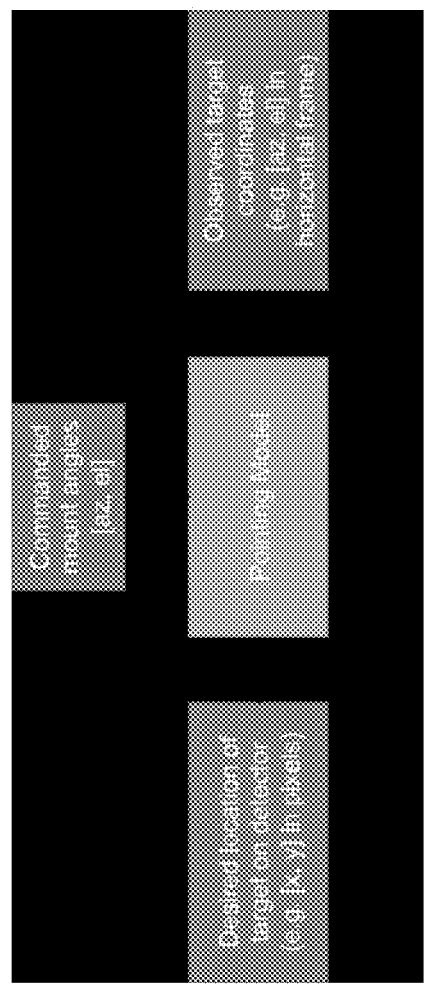
FIG. 11 is a block diagram showing the basic telescope pointing problem of how to generate mount angles.

FIG. 11 shows a block diagram of the pointing problem, which is a transformation between a target vector 1102 in a local horizontal reference frame and the desired "look vector" in the reference frame of the camera behind the telescope. Stated more simply, what mount rotation will center the target on the camera? This process generally transforms through several intermediate reference frames including the azimuth and elevation rotation of the telescope. The goal of the pointing model is to determine the correct command inputs to the telescope mount in azimuth and elevation. It is worth noting that these inputs appear in the middle of the pointing model transformation chain.

A basic piece of information needed in the pointing model is the mount orientation. This is an attitude transformation from the target coordinate frame (e.g., local horizontal frame) to the mount frame defined by the two gimbal axes of the gimbal on which the telescope is mounted. In other words, when the mount encoders read zero degrees in azimuth and elevation, where is the telescope actually pointed? This brings up a key difference between amateur telescopes and professional telescopes. Professional telescopes have absolute encoders (or at least some form of "zero-set") so that the orientation information is never lost. Amateur telescopes tend to have incremental encoders that measure changes in orientation rather than absolute orientation, so on powering up the telescope there is usually no information on orientation.

In addition, each telescope may have mechanical imperfections and known effects that produce error. For high accuracy pointing, these sources of error should be calibrated and included in the pointing model, but this is sometimes overlooked in amateur telescope software. The following sections discuss pointing models for amateur and professional telescopes.

Professional Telescopes

Existing software, such as TPOINT, can develop a pointing model with common error terms based on a series of star observations. This software is used worldwide on professional observatories, including the 3.9 m Anglo-Australian Telescope, the 10 m Keck Telescope, the 4 m SOAR Telescope, the 4×8.2 m Very Large Telescope, the Green Bank 100 m Telescope, the 66×12 m/7 m Atacama Large Millimeter Array, the 4.2 m William Herschel Telescope, the 4 m Mayall Telescope, the 4 m CTIO Blanco Telescope, the 2×8.2 m Gemini Telescopes, the 3.5 m ARC Telescope, the 3.5 m WIYN Telescope, the 3.8 m United Kingdom Infrared Telescope, the 76.2 m Lovell Telescope, the 3 m NASA Infrared Telescope Facility, the 6.5 m Multiple Mirror Telescope, the 2×6.5 m Magellan Telescopes, and the 2×8.4 m Large Binocular Telescope. These telescopes can point with arcsecond-level accuracy.

The TPOINT software has led to many offshoots and variations, but a revised version proposed by the original developer P. Wallace condenses the prior version into a 7-term model. Whereas the prior version had many terms which each applied a linear correction [$\Delta$Az, $\Delta$El] to the commanded mount angles, the revised model is based on a more rigorous matrix/vector formulation. Wallace also provided a very simple pointing model that produces linear corrections from the 7 terms.

Professional telescopes generally come as altazimuth or equatorial mounts, and TPOINT software generalizes to any two-axis gimbal mount. Before presenting the 7-term model, it is worth highlighting that the model relies on a concept of nominal orientation. For example, an altazimuth telescope is commonly idealized as level with a zero azimuth angle pointing north. The parameters of the model are linearized and fit based off of this nominal orientation which must be specified.

The pointing model includes the following seven terms: roll index error (IA), pitch index error (IB), vertical deflection (VD), optical telescope assembly/pitch nonperpendicularity (CA), roll/pitch nonperpendicularity (NP), and two terms for roll axis misalignment (AW, AN). The transformation chain is shown in FIG. 12, with vectors in intermediate frames in boxes and the transformations between vectors in italics. There are three key coordinate sets in the chain: the target direction [$\alpha$, $\delta$] (i.e., azimuth, elevation), the mount encoder readings [A, B], and the pointing-origin [x, y]. Knowing two of these coordinate sets can provide the third. The typical pointing problem is knowing the target direction and the pointing-origin which allows calculation of the desired mount encoder readings. This is the problem formulation shown in FIG. 11, but guiding corrections can be applied at multiple points.

The first two terms are the roll index error (IA) and pitch index error (IB). These terms describe when the true zero position of the pitch and roll axes is slightly off from the nominal orientation. For example, an altazimuth mount could have a zero-azimuth reading that should correspond with due north, but in reality is slightly east or west of north. This would be captured in the roll index error (IA) term. Likewise, the zero position of the elevation axis should lie on the horizon. If it is slightly above or below the horizon, this is captured in the pitch index error (IB) term. These terms act as additive corrections to the encoder readings.

The vertical deflection (VD) term captures the tendency of the telescope to droop from gravity. The deflection is proportional to the cosine of the elevation angle. Since this term is attitude dependent it should be recalculated every few seconds. The optical telescope assembly/pitch nonperpendicularity (CA) corrects the assumption that the pitch axis and the boresight of the telescope are perpendicular, when in reality they may not be. The second nonperpendicularity term is the roll/pitch nonperpendicularity. While the two gimbal axes are nominally perpendicular, they may be slightly misaligned which is captured in this term.

Finally, there are two terms for the roll axis misalignment (AW, AN). For example, an altazimuth telescope should have a telescope base that is level such that the azimuth gimbal axis points perfectly downwards. In reality, however, the telescope base may be tilted towards the north or towards the west. Combined, these seven terms are used in the pointing model to generate desired encoder readings to steer the telescope towards the target. In TPOINT software there are also harmonic terms that can be used to clean up remaining residuals.

Amateur Telescopes

Many amateur telescopes can be purchased with a computerized alignment procedure built in. To understand how these alignment procedures work, consider the options available from two major amateur telescope providers, Meade and Celestron. While the internal pointing model is not documented, the alignment procedures provide some information.

The Celestron CPC series provides full computerized "Go To" and tracking capabilities for a database of objects. The CPC comes with a Global Positioning System (GPS) receiver to determine position and time. It is worth noting that these telescopes have incremental encoders, so that wherever the telescope is pointing upon startup becomes the zero azimuth, zero altitude position.

There are several options available to the user for alignment. The simplest is the One-Star Align, where a single star is identified by the user and centered in the eyepiece (or detector). This measurement constrains two degrees of freedom (DOF) and assumes the telescope is level to constrain the third degree of freedom. This is the minimum amount of information needed to provide mount orientation.

Other procedures available include a Two-Star Align and a SkyAlign procedure. While One-Star and Two-Star Align require that a star be identified by the user, SkyAlign does not require that any stars be user-identified. Given three stars centered in the eyepiece/detector behind the telescope, the software can search a database to identify the stars and provide a unique mount orientation. It is likely that the alignment procedure relies on an assumption about the nominal axis of the roll gimbal since there are separate procedures for altazimuth and equatorial alignments. Given that only one star is required for alignment, it is likely that the software is only estimating the roll and pitch zero position, and additional star sightings are used to improve the accuracy of this estimate. There may be more complexity to the pointing model internally, but in the simplest case only two degrees of freedom are determined.

The Meade LX200 series telescope, one of which is shown in FIG. 13, provides similar computerized functionality to the Celestron CPC series. As with the CPC series, the encoders are incremental. The LX200 is also equipped with GPS and has additional true-level and true-north sensors. The telescope offers an Auto Align feature. It uses its sensors to find the level of the telescope base (i.e., the orientation of the roll axis) and the direction of magnetic north, and also gets a GPS fix. These measurements alone are enough to provide an initial mount orientation. The program then slews to two different stars for the user to center in the eyepiece/detector.

Alternatives to the Auto Align feature are a manual one- or two-star alignment that do not use sensor information and therefore require manual leveling of the telescope base. This is the same procedure as described with the Celestron mount. The LX200 series has sensors that the CPC series does not have, and does not assume that the telescope base must be level. However, the small number of star sightings indicates that the pointing model is probably not much more complex than a simple 3-DOF orientation.

The accuracies of the built-in alignment procedures are hard to assess because they depend on user experience. When only one or two stars are selected for alignment, the locations of these stars affect accuracy of the procedure. However, tests conducted with a CPC1100 acquired by MIT STAR Lab using the two-star alignment procedure generally gave accuracies on the order of hundreds of arcseconds.

While the built-in alignment software for amateur telescopes rely on fairly simple pointing models, there are software options for higher fidelity models. For example, Software Bisque provides TheSkyX astronomy software that includes telescope models based on TPOINT. These rely on a procedure similar to professional telescopes where a large number of star sightings generate correction terms in the pointing model.

Shortcomings of Available Pointing Procedures

The optical ground stations disclosed here use amateur telescopes with nearly professional-level pointing performance. They do not use built-in alignment software for amateur telescopes because the built-in alignment software is not good enough to ensure a lasercom signal is detected.

There are also drawbacks to using professional software. The calibration procedure for professional telescopes is very time-consuming. Dozens of star sightings are required to fit the pointing model. Stars must be identified and centered in a partially manual process. While this may be reasonable for observatories that remain very stable over time and only need to calibrate rarely, it is much less suitable for an amateur telescope. The incremental encoders of an amateur telescope mean that turning the telescope off requires recalibration.

The approach of professional software also poses a disadvantage for the portability aspect of the proposed optical ground station. If the telescope is packed up and redeployed frequently, the calibration procedure should be as rapid and automated as possible. And because a portable ground station may be redeployed frequently, it may not have the benefit of a stable, nominal telescope orientation. Rather than having to ensure manually that the telescope is near-perfectly leveled and aligned to zero-azimuth north, it would be much easier to eliminate these assumptions in software.

To overcome the shortcomings of available amateur and professional pointing software, a ground station disclosed here can use an automated, rapid, and high-fidelity calibration procedure. For speed and autonomy, a wide field-of-view star tracker is used for measurements rather than user-identified and centered stars imaged with a detector behind the telescope. The calibration is augmented to include the seven pointing model terms disclosed above. The calibration process can be implemented as a quaternion-based formulation that is is agnostic to mount orientation and initial telescope position; these are determined by observations rather than set manually beforehand.

Ground Station Tracking

This section reviews examples of the state-of-the-art approach of tracking satellites with existing optical ground stations. It then discusses related work in satellite orbit determination and discloses a tracking approach used by inventive ground stations.

The pointing models in the sections above describe how to relate mount encoder angles to celestial pointing coordinates. Often, a telescope should dynamically track an object (e.g., a LEO satellite) rather than just point statically. Open-loop tracking refers to the phase before the target is seen and known orbital elements provide a desired tracking trajectory.

One way to approach trajectory tracking is to generate a series of angle commands for the telescope using the orbital elements and the telescope pointing model. The desired trajectory results from following a series of waypoints. This is the approach proposed by Wallace in the TPOINT model. However, this requires an internal controller to execute the angle commands, which for amateur telescopes can have significant overshoot or other performance deficiencies.

It makes more sense to drive the gimbal rate directly. Given a pointing model of the form in FIG. 11, it is possible to back out desired gimbal rates by differentiating the equation that relates the observed vector in the detector frame to the desired vector in local horizontal coordinates. As in the case of generating angle commands, the equations should be implicitly solved for the desired rates. The TPOINT model discussed above does not explicitly provide these equations.

Once the target is seen, detector measurements can be used to improve tracking. This begins the closed-loop tracking phase. Closed-loop tracking corrections can be applied at multiple points in the pointing model. Alternatively, gimbal rate adjustments can be used to drive the tracking error to zero.

Current Professional Telescopes

Optical ground stations typically have a fine pointing system that does closed-loop tracking of the downlink signal. In many cases, open-loop tracking by the mount is sufficient to stay within the range of the fine pointing system such that closed-loop telescope tracking is not required.

It is useful to look at the tracking strategies of the optical ground stations described in the Background above. ESA-OGS tracks a satellite open-loop and only offloads when the fine pointing system reaches the edge of its range. Likewise, OCTL tracks open-loop with a periodic angular offset to offload the fine pointing system. TOGS begins with open-loop tracking and then applies closed-loop corrections to the mount by a series of angular offsets calculated from image centroids. Likewise, TAOGS begins with an open-loop trajectory and applies angular offsets once the signal is acquired. It is worth noting that these ground stations are all driven by angle inputs rather than directly by rate.

Current Amateur Telescopes

Another application that has generated interest in low-cost telescope tracking of LEO objects is space situational awareness and space debris tracking. An effort at RC Optical Systems successfully adapted a mid-size commercial-off-the-shelf telescope to track LEO objects. In this work, TPOINT software is used for precision pointing and tracking onto a 0.39×0.39 degree camera FOV. The effort relied on TLEs from JSpOC for orbit prediction. A separate aperture with a FOV of 1.28×0.85 degrees is used for acquisition, and it was found that open-loop tracking was sufficient to maintain the satellite within the main camera FOV in most cases. Real-time nonlinear least squares is used to fit SGP4 Keplerian elements from observed position.

The U.S. Air Force has also pursued development of autonomous low-cost telescopes for observing space objects. The High Accuracy Network Determination System (HANDS) relies on amateur telescopes running the Software Bisque distribution of TPOINT. Orbital elements are fit based on observed satellites and background stars.

Finally, the Virginia Tech Optical Satellite Tracking Telescope (VTOST) combines a narrow FOV amateur telescope with a large FOV camera for acquisition and tracking of satellites. When not in use, the mount remains powered to avoid having to perform realignment. Tracking relies on TLEs to generate angle commands for open-loop pointing, which the author notes is the driving motivation for the large FOV acquisition camera. Closed-loop pointing updates are provided by analyzing streaks in the camera and generating angular corrections.

There are some differences between using amateur telescopes for space object tracking and lasercom that are worth noting. For space object tracking, the pointing requirements are much less stringent. The object should remain within the FOV of a camera on the order of a degree, whereas for lasercom a fine pointing system should steer the signal onto the receiver with a FOV on the order of thousandths of a degree. At shortwave infrared wavelengths for laser communications, there are fewer low-cost sensors than at the visible wavelengths used for space object tracking. The systems developed for space object tracking are also intended to be fixed, so they do not address the issue of rapid calibration.

Shortcomings of Current Ground Station Tracking

In developing a tracking approach for a portable optical ground station, there are several gaps in the current approaches. While most existing tracking is based on an open-loop trajectory of angle commands, this forces a reliance on the internal controller of the amateur telescope, which can have large overshoot or other deficiencies. Conversely, the inventive approach generates open-loop commands based on differentiating the pointing model combined with known orbital elements to generate rate commands.

The standard approach to closed-loop tracking is a series of angular corrections. However, this does not fully utilize the model of the observation. Instead, inventive approaches can incorporate these measurements into a tracking filter that includes orbital elements and pointing model terms in the state.

Small satellites commonly rely on publicly-available TLEs for orbit determination, but these can suffer from large error for LEO satellites. These errors are large enough to be a dominant source of tracking error, but it has been repeatedly observed that the error is predominately confined to the in-track component. For the duration of a <10 minute pass, the orbital dynamics can be simplified to the two-body problem, and the initial position and velocity are supplied by a TLE or other source of orbital elements.

While for professional telescopes it may be appropriate to assume pointing model terms are fixed after calibration, for portable amateur telescopes the environment is not as controlled. Therefore, inventive approaches may include terms from the pointing model in the tracking filter to enable real-time updates.

Portable Optical Ground Stations for Satellite Lasercom

This section discloses a portable optical ground station suitable laser-based communications with a satellite in LEO. The ground station can use different amateur telescopes and sensors. The point design disclosed below and shown in FIG. 14 is tailored to the requirements of the NODE project, specifically the size of the aperture and the 1550 nm downlink wavelength. However, the approach of using a star camera for rapid alignment as well as the supporting pointing and tracking algorithms are generalizable to any two-axis telescope/mount.

FIG. 14 shows a block diagram of a portable optical ground station 1400 that may weigh less than 50 kg and cost less than $25,000 to build. The ground station 1400 includes a tracking assembly 1402 and a receiver assembly 1404. The tracking assembly 1410 includes an amateur telescope 1410 mounted on a two-axis gimbal mount 1420 (e.g., an altazimuth or equatorial mount). The telescope 1410 may have an aperture of up to and including 1 meter (e.g., 6 inches, 12 inches, 50 cm, 55 cm, etc.). A star camera 1430 is attached to the telescope 1410. Incremental angle encoders 1422 coupled to the gimbal mount 1420 measure the relative changes in angle of the gimbal mount 1420 about the two axes. For instance, if the gimbal mount 1420 is an altazimuth mount, the incremental encoders 1422 may include a first incremental encoder that measures relative change in azimuth and a second incremental encoder that measures relative change in altitude.

A processor 1440 (e.g., in a laptop personal computer (PC)) is used to drive the gimbal mount 1420. During the alignment calibration process, the processor 1440 processes images from the star camera 1430. The processor 1440 receives encoder feedback from the incremental encoders 1422 and provides rate commands to the gimbal mount 1420 during tracking of the satellite.

The receiver assembly 1404 is behind the telescope 1410 and implements fine pointing. The receiver assembly 1404 includes a tracking camera 1470 and an avalanche photodiode (APD) receiver 1480 in optical communication with the eyepiece of the telescope 1410 via a fast-steering mirror (FSM) 1450 and a beam splitter 1460. In operation, the processor 1440 provides digital tip/tilt commands, which are converted to analog voltage to drive the FSM 1450. The beam splitter 1460 splits the downlink signal received by the telescope 1410 between the tracking camera 1470 and the APD receiver 1480. Feedback from the tracking camera 1470 is processed by the processor 1440 to provide steering commands to the FSM 1450.

The processor 1440 does not necessarily receive communications data. Rather, the processor 1440 uses power measurements from the APD receiver 1480 to align the tracking camera 1470 with the signal source (e.g., a LEO satellite) and ensure the FSM 1450 is steering peak signal onto the APD receiver 1480. (The ground station 1400 may also include a beacon uplink (not shown)).

The portable ground station 1400 weighs 50 kg or less (e.g., 10, 20, 30, or 40 kg) and can therefore be carried by one to two people. The portable ground station 1400 can be set up and calibrated within an hour with a blind pointing accuracy of 180 arcseconds RMS or less (e.g., 150, 125, 100, 75, 50, 25, or 10 arcseconds RMS). A one-hour setup time allows the telescope 1410 to be deployed and repacked in a single night. The blind pointing accuracy is based on the FOV of the receiver assembly 1404. The telescope 1410 should point accurately enough that the tracking detector 1470 can see the target to provide closed-loop feedback. The receiver assembly 1404 can be implemented with a FOV for the tracking detector 1470 of about ±500 arcseconds. The blind pointing accuracy is chosen to leave enough margin to ensure the target is seen.

FIG. 15 is a photograph of an implementation of the ground station 1400 shown in FIG. 14. In this case, the amateur telescope 1410 is the Celestron CPC1100. The telescope 1410 is shown on the roof of MIT Building 37 in FIG. 15. The telescope 1410 has an 11" (28 cm) aperture and is in a Schmidt-Cassegrain configuration. The telescope 1410 has a focal ratio of f/10, corresponding with a field of view of 0.6 degrees. Mounted to the telescope 1410 is an iNova PLB-Mx2 camera used as a star tracker 1430. A 35 mm focal length lens is paired with the camera, resulting in a FOV of 7.8×5.9 degrees.

FIG. 16 shows a block diagram of the receiver assembly 1404 with example hardware identified. There are two sets of sensors depending on the downlink wavelength. Silicon detectors work in the visible up to about 1000 nm, and beyond that InGaAs detectors are used, e.g., for 1550 nm downlinks.

In the example of FIG. 16, the FSM 1450 is an Optics In Motion 1" mirror with a throw of ±1.5 degrees. The bandwidth is >850 Hz with an angular resolution better than 2 μrad, and actuation is done with voice coils. The receiver 1480 is a Voxtel RDC1-NJAF APD. This APD has a 200 micron sensor and a bandwidth of 300 MHz. This receiver has low noise and high bandwidth. The IR tracking camera 1470 is a Sensors Unlimited Micro SWIR 640CSX. It is an InGaAs camera with 640×512 pixels with a 12.5-micron pitch, resulting in an 8.0×6.4 mm active area. The camera was selected for its high sensitivity and full-frame readout rate of 30 Hz.

The hardware is mounted to the telescope on an optical breadboard, shown in FIG. 17. The components in this assembly match the block diagram from FIG. 16. The FSM is mounted along the boresight of the telescope at a 45-degree angle which brings the signal into the plane of the optical breadboard. The beam splitter divides the signal between the tracking camera and APD.

In this example, there are no collimating optics, and the tracking camera and APD are placed at the focus of the telescope. This reduces the number of components, but it also limits the FOV of the system. Other example may include collimating or other optics and as a result have higher FOVs. The mass and mass distribution of the back-end assembly may be selected to avoid imbalancing the telescope.

The mount, star camera, FSM, and tracking camera are controlled from the laptop. A graphical user interface developed in Visual Studio is used to execute all ground station activity and the software is implemented in a combination of C, C++, and C#.

Ground Station Pointing and Tracking

FIGS. 18A and 18B illustrate aspects of pointing a ground station at a satellite and tracking the satellite with the ground station. The alignment calibration can be divided into two levels: coarse calibration and fine calibration. In coarse alignment calibration, the processor calculates the alignment quaternions without any prior information. The result is used as an initial value for the fine alignment calibration described below.

FIG. 18A is a schematic diagram that shows Cartesian coordinates in the frames of reference for the telescope 1410, gimbals 1420, and star camera 1430. These frames of references can be related to each other using images acquired with the telescope and star camera and readings from the (incremental) encoders (not shown) on the gimbal mount. The Y-axis of the gimbal frame is defined as the rotation axis of the azimuth (Azi) motor when the telescope is initialized. Likewise, the X-axis is defined as the rotation axis of the altitude (Alt) motor when initialized. These correspond to zero Azi/Alt angles. The Z-axis of the gimbal frame is defined by the cross product of the X-axis and Y-axis. The telescope frame is initially aligned with the gimbal frame and is fixed to the telescope through Azi/Alt rotation. The Z-axis of the camera frame is defined by the LOS of the star camera and the X and Y axes are the star camera's lateral and vertical directions. These frames are described in greater detail below and can be related to the satellite position using an Earth-centered inertial (ECI) frame, an Earth-centered Earth-fixed (ECEF) frame, and the time (e.g., in coordinated universal time) and appropriate models for translating between the ECI and ECEF frames.

FIG. 18B shows a process 1800 for calibrating the reference frames shown in FIG. 18A and discussed in greater detail below, pointing the ground station at a satellite based on the calibrated reference frames, and tracking the satellite with the ground station. The process 1800 includes using the wide field of view star camera 1430 to determine the ground station's orientation with respect to an (Earth-centered) inertial frame. Star cameras are accurate to the arcsecond level, and they have the advantage of providing orientation with a single measurement.

In step 1802 of the process 1800, the star camera makes multiple star sensor measurements at different gimbal angles. In step 1804, the processor determines the star camera alignment with respect to the ECI frame using one or more of the star camera images. By matching the pattern of stars captured by the star camera, the processor can calculate the orientation of the star camera frame with respect to an ECI frame, such as J2000, at the image capture time. By taking multiple images over the sky, it is possible to calculate the alignment between the telescope frame and ECEF frame as well as the alignment between telescope and the star camera. More details are described below.

Star identification has been extensively researched for decades and a large number of processes have been proposed, each with different advantages. For example, the ground station processor may implement a correlation-based star pattern matching process. Correlation can be disadvantageous in terms of processing time since it calculates an exponential function for the matching-scores. However, it provides additional robustness with respect to the star center position error. While computation time may be a concern for spacecraft with limited resources, it is suitable for a system with a 2.7 GHz CPU as a processing unit, and the additional robustness is advantageous given that the star camera is an uncalibrated with a COTS lens.

The identification process matches the star pattern to a star catalog, such as SKY 2000, and gives the corresponding star vectors in the J2000 frame. More specifically, the star catalog may include stars with brightnesses of 5.5 Mv and up. For the final calibration, the processor may use images that have a minimum number of stars that meet a certain criterion, e.g, at least six stars identified with a good "score." The exact numbers and types of stars may vary depending on the desired tradeoff based on search time through the star catalog, star identification process, and certainty of identifying each star correctly. Since the star vectors are determined in the camera frame, the processor can calculate the attitude quaternion of the star camera frame with respect to the J2000 frame using the QUaternion ESTimation (QUEST) algorithm, which can also be used for spacecraft attitude determination from vector measurements.

In step 1806, the processor computes the alignment of the ECI frame with respect to the ECEF frame using the measurement time (e.g., in UTC time). In step 1808, the processor determines the alignment of the gimbals in the ECEF frame and the alignment of the star sensor in the gimbal frame using the star camera images and the encoder readings for the star camera images. Once the alignment is obtained, satellite tracking can be achieved easily with a known orbit and precise Earth rotation model such as the International Earth Rotation and Reference System Service (IERS).

Another issue for the initial alignment is obtaining the alignment between star camera and the actual line-of-sight (LOS) of the telescope. The telescope mount initializes its azimuth (Azi) and Altitude (Alt) angle as zero every time it is turned on, so the actual LOS is unknown to the telescope frame. Therefore, the processor calculates the LOS of the telescope frame every time the ground station is set up. To obtain the LOS, another astronomy camera, e.g., the Orion StarShoot USB Eyepiece II, captures an image through the telescope (step 1810). The processor uses this image and a star camera image taken at the same gimbal angles to determine the LOS (step 1812).

The star camera to telescope LOS could be calculated autonomously if images of star patterns could be taken with the eyepiece camera, but the FOV is usually too narrow for this to be practical. The focal length of the CPC 1100 is 2.8 m and the detector size of the eyepiece camera is 3.8 mm×2.9 mm, so the FOV is 0.078 deg×0.059 deg or 282 arcsec×212 arcsec.

It can be hard to capture a star within this narrow field of view with unknown mount angles. Therefore, the telescope can be pointed manually or commanded to point at a distant, fixed light source in the sky or on the ground with the eyepiece camera. Taking a picture of this light source with the star camera and calculating the LOS vector in the camera frame yields the desired alignment.

With expected satellite coordinates in the ECI frame, the processor computes the desired pointing angle from the alignments among the various frames of reference and commands the gimbal mount accordingly. The ground station points at the satellite (step 1820), acquires it, and tracks it (step 1830) possibly using a beacon or additional images acquired with the star camera, an infrared (IR) camera, or other sensor as described below.

Ground Station Pointing Derivation

This section covers the derivation of the pointing calibration process and how it relates to professional telescope control software. The calibration process is based on a quaternion formulation that uses nonlinear least squares to estimate error terms in the pointing model. The reference frames and the quaternion notation are defined first, followed by the derivation.

Quaternion Convention

The following convention for the error quaternion is used throughout this work. The current estimate of the quaternion has an error of $\delta q$ such that the true quaternion is given by:

$$q = \delta q \otimes \hat{q} \qquad (1)$$

where $\hat{q}$ is the quaternion estimate.

The quaternion vector and scalar components are represented as:

$$q = \begin{bmatrix} Q \\ q \end{bmatrix} \qquad (2)$$

With this convention, multiplication of quaternion p by quaternion q is given by:

$$p \otimes q = \begin{bmatrix} pQ + qP - P \times Q \\ pq - P \cdot Q \end{bmatrix} \qquad (3)$$

Finally, the notation for the direction cosine matrix corresponding to a quaternion is A(q), which can be calculated by:

$$A(q) = \begin{bmatrix} q^2 + Q_0^2 - Q_1^2 - Q_2^2 & 2(Q_0Q_1 + qQ_2) & 2(Q_0Q_2 - qQ_1) \\ 2(Q_0Q_1 - qQ_2) & q^2 - Q_0^2 + Q_1^2 - Q_2^2 & 2(Q_1Q_2 + qQ_0) \\ 2(Q_0Q_2 + qQ_1) & 2(Q_1Q_2 - qQ_0) & q^2 - Q_0^2 - Q_1^2 + Q_2^2 \end{bmatrix} \quad (4)$$

Reference Frames

FIG. 18A shows some of the reference frames used to align and calibrate the telescope for pointing at the satellite and tracking the satellite. These reference frames include an The J2K or J2000 frame is an Earth-centered inertial (ECI) frame. The fundamental plane of this frame is the equator, and the X axis points towards the vernal equinox. The Z axis points through the North Pole, and the Y axis forms a right-handed set 90 degrees east of the X axis. These directions are fixed with the mean equator and equinox at 12:00 Terrestrial Time on Jan. 1, 2000.

The East-North-Up (ENU) frame provides local horizontal coordinates. It is centered at the telescope site. The X axis is defined as north, the Y axis as east, and the Z axis forms a right-handed set towards zenith. The transformation from the J2K frame to the ENU frame changes constantly as the earth rotates. (The ENU frame is two rotations from the Earth-Centered Earth-Fixed (ECEF) as explained here: http://navipedia.net/index.php/Transformations_between_ECEF_and_ENU_coordinates. These two rotations can be combined into a single rotation by multiplying them together.)

The mount (MNT) frame is the reference frame centered on the gimbal mount. The Y axis is defined by the azimuth gimbal rotation axis at time $t_0$. The Z axis is defined as the cross product between the altitude and azimuth gimbal axes at time $t_0$. The X axis forms a right-handed set.

The gimbaled (GIM) frame is the mount frame rotated through gimbal azimuth $\psi_{gim}$ and altitude $\alpha_{gim}$ as read by the encoders. Note that the models accounts for nonperpendicularity between the azimuth and altitude axes of the gimbals.

The nominal telescope (TNOM or TEL) frame is the gimbaled frame rotated to align with the observed telescope frame assuming no vertical deflection. The X axis is the horizontal direction of the tracking detector behind the telescope. The Y axis is the vertical direction of the tracking detector behind the undeflected telescope. The Z axis is the undeflected telescope boresight.

The observed telescope (TOBS) frame is the nominal telescope frame rotated through vertical deflection. The X axis is defined by the horizontal direction in the tracking detector behind the telescope. The Y axis is defined by the vertical direction in the tracking detector behind the telescope. The Z axis is defined by the tracking detector boresight, which is assumed to be perpendicular to the focal plane.

The star tracker (ST or CAM) frame is the frame of reference centered on the star tracker. The X axis is defined by the horizontal direction in the tracking detector behind the telescope. The Y axis is defined by the vertical direction in the tracking detector behind the telescope. The Z axis is defined by the tracking detector boresight, which is assumed to be perpendicular to the focal plane.

Inter-Camera Alignment

Measurements are split into two sets which have different aims. In the first set of measurements, the goal is to estimate the rotation from the observed telescope frame to the star tracker frame, $^{ST}q_{TOBS}$, by simultaneously imaging a distant source in the star tracker and the tracking detector. The second set of measurements includes a series of star tracker images which are used to calibrate the remaining parameters of telescope alignment.

The mapping between the star tracker and the tracking detector behind the telescope is determined first. A distant source (e.g., a bright light or star) is imaged in each of the corners of the tracking detector and also captured with the star tracker. The images from the star tracker and tracking detector yield vector measurements of the source in the respective camera frames, $r_{src|ST}$ and $r_{src|TOBS}$.

These measurements are related by:

$$r_{src|ST} = A(^{ST}q_{TOBS}) r_{src|TOBS} \quad (5)$$

With these measurements, $^{ST}q_{TOBS}$ can be estimated using QUEST.

Star Tracker Images

Once the inter-camera alignment has been determined, additional calibration parameters can be determined by taking star tracker images at intervals throughout the entire sky. The model for these measurements and the calibration parameters are described in this section using the reference frames defined above.

The unit vector locations of the stars are assumed to be known in the J2K frame (i.e., assume precession, nutation, aberration, etc. are accounted for) and the star tracker image quaternion is assumed to be corrected for refraction. Each star tracker image yields a quaternion rotation between the J2K frame and the star tracker frame, $^{ST}q_{J2K}$.

The $i^{th}$ star tracker measurement is given by:

$$^{ST}q_{J2K,i} = q_{n,i} \otimes {}^{ST}q_{TOBS} \otimes {}^{TOBS}q_{TNOM,i} \otimes {}^{TNOM}q_{GIM} \\ \otimes {}^{GIM}q_{MNT,i} \dots \otimes {}^{MNT}q_{ENU} \otimes {}^{ENU}q_{JRK,i} \quad (6)$$

where $q_{n,i}$ is the star tracker measurement noise.

The rotation between the camera frames, $^{ST}q_{TOBS}$, is known from the calculation above. The rotation from the J2K to ENU frame, $^{ENU}q_{J2K,i}$, can be calculated using the International Earth Rotation and Reference Systems Service (IERS) model. The other rotations each contain unknown calibration parameters which will be defined.

The rotation from the ENU frame to the mount frame, $^{MNT}q_{ENU}$, is unknown and should be estimated fully. The rotation from the mount frame to the gimbaled frame is given by a rotation through the known azimuth and altitude gimbal angles, $\psi_{gim,i}$ and $\alpha_{gim,i}$, which can be read out from the encoders. Splitting the rotation into azimuth and altitude:

$$^{GIM}q_{MNT,i} = q_{alt,i} \otimes q_{azi,i} \quad (7)$$

The azimuth rotation is simply given by:

$$q_{azi,i} = \begin{bmatrix} 0 \\ \sin(\psi_{gim,i}/2) \\ 0 \\ \cos(\psi_{gim,i}/2) \end{bmatrix} \quad (8)$$

The altitude rotation is complicated by allowing for nonperpendicularity of the gimbal rotation axes. The nonperpendicularity is described by a rotation angle $\theta_{NP}$ in the XY plane of the mount frame (refer to definition). With the parameter $\theta_{NP}$ to be estimated, the rotation through the altitude gimbal is given by:

$$q_{alt,i} = \begin{bmatrix} \cos(\theta_{NP})\sin(\alpha_{gim,i}/2) \\ \sin(\theta_{NP})\sin(\alpha_{gim,i}/2) \\ 0 \\ \cos(\alpha_{gim,i}/2) \end{bmatrix} \quad (9)$$

Equations 7-9 define the rotation from the mount frame to the gimbaled frame, which contains one unknown, $\theta_{NP}$.

The next rotation is from the gimbaled frame to the nominal telescope frame, $^{TNOM}q_{GIM}$. This rotation accounts for the fact that the telescope boresight and detector axes do not have to be aligned with the gimbal rotation axes. It is particularly relevant to account for this unknown for a telescope with incremental encoders (i.e., the zero position of the telescope is arbitrary upon startup). This rotation is unknown and should be estimated fully.

The rotation from the nominal telescope frame to the observed frame is given by a vertical deflection related to Hooke's Law and represented by an unknown vertical deflection coefficient, $a_d$. For notational simplicity, a term $c_d$ is introduced. This $c_d$ term that is the cosine of the elevation angle of the telescope boresight and is related to the state by:

$$c_{d,i} = \left(1 - \left(\left(A(^{TNOM}q_{ENU,i}^{-1})\begin{bmatrix}0\\0\\1\end{bmatrix}\right) \cdot \begin{bmatrix}0\\0\\1\end{bmatrix}\right)^2\right)^{\frac{1}{2}} \quad (10)$$

Furthermore, the term $v_d$ represents the axis about which vertical deflection occurs defined in the nominal telescope frame. It is given by the normalized cross product of the telescope boresight and the vertical:

$$v_{d,i} = \frac{\left(A(^{TNOM}q_{ENU,i})\begin{bmatrix}0\\0\\1\end{bmatrix}\right) \times \begin{bmatrix}0\\0\\1\end{bmatrix}}{\left\|\left(A(^{TNOM}q_{ENU,i})\begin{bmatrix}0\\0\\1\end{bmatrix}\right) \times \begin{bmatrix}0\\0\\1\end{bmatrix}\right\|} \quad (11)$$

With these terms defined, the rotation from the nominal telescope frame to the observed frame is described by:

$$^{TOBS}q_{TNOM,i} = \begin{bmatrix}\sin(a_d c_{d,i}/2)v_{d,i} \\ \cos(a_d c_{d,i}/2)\end{bmatrix} \quad (12)$$

In summary, the unknowns that must be estimated from star tracker images are $^{MNT}q_{ENU}$, $\theta_{NP}$, $^{TNOM}q_{GIM}$, and $a_d$. This results in a total of 8 unknown parameters, plus 3 unknown parameters from inter-camera alignment, resulting in a total of 11 unknowns in the overall model.

The relationship between these parameters and the parameters in TPOINT software (as described above) are shown in TABLE 2 (below). The proposed parameters encompass those from the condensed TPOINT model. One additional degree of freedom is included in the $^{TNOM}q_{GIM}$ term, which accounts for a rotation of the camera behind the telescope.

TABLE 2

Summary of pointing model parameters proposed in this work and how they relate to corresponding TPOINT terms. The proposed pointing model covers the same degrees of freedom as in Wallace plus one additional term.

| Proposed Parameter | TPOINT Parameter(s) | Description |
|---|---|---|
| $^{MNT}q_{ENU}$ | AW, AN, IA | Orientation of mount relative to local horizontal |
| $\theta_{NP}$ | NP | Altitude/azimuth gimbal nonperpendicularity |
| $^{TNOM}q_{GIM}$ | IB, CA | Orientation of telescope relative to gimbal frame |
| $a_d$ | VD | Vertical deflection |

Coarse calibration provides an initial state estimate for fine calibration. For coarse calibration, consider the following assumptions. Measurement noise is ignored, vertical deflection is ignored (i.e., the deflection coefficient $\alpha_d$ is assumed to be zero), and the rotation axis nonperpendicularity $\theta_{NP}$ is assumed to be zero such that $^{GIM}q_{MNT,i}$ is known from the encoder output. With these assumptions, the remaining unknowns in Eq. 6 are $^{TNOM}q_{GIM}$ and $^{MNT}q_{ENU}$, which must be estimated.

For notational simplicity, define:

$$^{TOBS}q_{ENU,i} @ ^{ST}q_{TOBS,i}^{-1} \otimes {}^{ST}q_{J2K,i} \otimes {}^{ENU}q_{J2K,i}^{-} \quad (13)$$

An $i^{th}$ and $j^{th}$ measurement can be used to estimate $^{TNOM}q_{GIM}$ with the following:

$$^{TOBS}q_{ENU,i} \otimes {}^{TOBS}q_{ENU,j}^{-1} = {}^{TNOM}q_{GIM} \otimes {}^{GIM}q_{MNT,i} \otimes {}^{MNT}q_{ENU} \cdots \otimes \quad (14)$$
$$({}^{TNOM}q_{GIM} \otimes {}^{GIM}q_{MNT,i} \otimes {}^{MNT}q_{ENU})^{-1}$$
$$= {}^{TNOM}q_{GIM} \otimes {}^{GIM}q_{MNT,i} \otimes {}^{GIM}q_{MNT,j}^{-1} \cdots \otimes$$
$$^{TNOM}q_{GIM}^{-1}$$
$$= \begin{bmatrix}A(^{TNOM}q_{GIM}) & 0 \\ 0 & 1\end{bmatrix}^{GIM} q_{MNT,i} \otimes {}^{GIM}q_{MNT,j}^{-1}$$

With QUEST, a set of measurements can be used to estimate $^{TNOM}q_{GIM}$.

Similarly, $^{MNT}q_{ENU}$ can be estimated given an $i^{th}$ and $j^{th}$ measurement with the following:

$$^{TOBS}q_{ENU,i}^{-1} \otimes {}^{TOBS}q_{ENU,j} = ({}^{TNOM}q_{GIM} \otimes {}^{GIM}q_{MNT,i} \otimes {}^{MNT}q_{ENU})^{-1} \cdots \otimes \quad (15)$$
$$^{TNOM}q_{GIM} \otimes {}^{GIM}q_{MNT,j} \otimes {}^{MNT}q_{ENU}$$
$$= {}^{MNT}q_{ENU}^{-1} \otimes {}^{GIM}q_{MNT,i}^{-1} \otimes {}^{GIM}q_{MNT,j} \otimes$$
$$^{MNT}q_{ENU}$$
$$= \begin{bmatrix}A(^{MNT}q_{ENU}^{-1}) & 0 \\ 0 & 1\end{bmatrix}^{GIM} q_{MNT,i}^{-1} \otimes {}^{GIM}q_{MNT,j}$$

With these coarse estimates, it is possible to proceed to fine calibration.

Fine calibration uses a least squares approach with the initial state supplied by coarse calibration. There are 8 unknown parameters to be estimated. The error state is given by:

$$\delta x = \begin{bmatrix} \delta a_d \\ {}^{TNOM}\delta Q_{GIM} \\ \delta\theta_{NP} \\ {}^{MNT}\delta Q_{ENU} \end{bmatrix} \quad (16)$$

The star tracker measurement follows Eq. 6, which is combined with Eq. 1 to calculate the error quaternion. The error quaternion can be broken into components as follows:

$$\begin{aligned}
{}^{ST}\delta q_{J2K,i} &= q_{n,i} \otimes {}^{ST}q_{TOBS} \otimes {}^{TOBS}(\delta q \otimes \hat{q})_{TNOM,i} \cdots \otimes \\
&\quad {}^{TNOM}(\delta q \otimes \hat{q})_{GIM} \otimes {}^{GIM}(\delta q \otimes \hat{q})_{MNT,i} \otimes \\
&\quad {}^{MNT}(\delta q \otimes q)_{ENU} \cdots \otimes \\
&\quad {}^{ENU}q_{J2K,i} \otimes ({}^{ST}q_{TOBS} \otimes {}^{TOBS}\hat{q}_{TNOM,i} \cdots \otimes {}^{TNOM}\hat{q}_{GIM} \otimes \\
&\quad {}^{GIM}q_{MNT,i} \otimes {}^{MNT}q_{ENU} \otimes {}^{ENU}q_{J2K,i})^{-1} \\
&= q_{n,i} \otimes \begin{bmatrix} A({}^{ST}q_{TOBS}) & 0 \\ 0 & 1 \end{bmatrix}^{TOBS}\delta q_{TNOM,i} \cdots \otimes \\
&\quad \begin{bmatrix} A({}^{TOBS}\hat{q}_{TNOM,i}) & 0 \\ 0 & 1 \end{bmatrix}^{TNOM}\delta q_{GIM} \cdots \otimes \\
&\quad \begin{bmatrix} A({}^{TNOM}\hat{q}_{TIM}) & 0 \\ 0 & 1 \end{bmatrix}^{GIM}\delta q_{MNT,i} \cdots \otimes \\
&\quad \begin{bmatrix} A({}^{GIM}\hat{q}_{MNT,i}) & 0 \\ 0 & 1 \end{bmatrix}^{MNT}\delta q_{ENU}
\end{aligned} \quad (17)$$

The vector portion of the error quaternion is then approximated as:

$$\begin{aligned}
{}^{ST}\delta Q_{J2K,i} &\approx Q_{n,i} + A({}^{ST}q_{TOBS})^{TOBS}\delta Q_{TNOM,i} \cdots + \\
&\quad A({}^{TOBS}\hat{q}_{TNOM,i})^{TNOM}\delta Q_{GIM} \cdots + \\
&\quad A({}^{ST}\hat{q}_{GIM,i})^{GIM}\delta Q_{MNT,i} + A({}^{ST}\hat{q}_{MNT,i})^{MNT}\delta Q_{ENU}
\end{aligned} \quad (18)$$

From Eq. 18, ${}^{TNOM}\delta Q_{GIM}$ and ${}^{MNT}\delta Q_{ENU}$ are state components, but ${}^{TOBS}\delta Q_{TNOM,i}$ and ${}^{GIM}\delta Q_{MNT,i}$ should be related back to the state components.

First, ${}^{GIM}\delta Q_{MNT,i}$ is related back to the state components. Equations 7-9 describe the rotation between the mount frame and the gimbaled frame. The azimuth gimbal rotation at the $i^{th}$ measurement is represented by $q_{g1,i}$, which is equivalent to $q_{azi,i}$ in Eq. 8. The rotation of the altitude gimbal at the $i^{th}$ measurement can be represented (equivalently to Eq. 9) as:

$$q_{alt,i} = \begin{bmatrix} A(q_{NP}) & 0 \\ 0 & 1 \end{bmatrix} q_{g2,i} \quad (19)$$

where $q_{NP}$ and $q_{g2,i}$ are given by $$q_{NP} = \begin{bmatrix} 0 \\ 0 \\ -\sin(\theta_{NP}/2) \\ \cos(\theta_{NP}/2) \end{bmatrix} \quad (20)$$

$$q_{g2,i} = \begin{bmatrix} \sin(\alpha_{gim,i}/2) \\ 0 \\ 0 \\ \cos(\alpha_{gim,i}/2) \end{bmatrix} \quad (21)$$

Following the form of Eq. 2 yields the following relationship for the error quaternion from the mount to the gimbaled frame:

$$\begin{aligned}
{}^{GIM}\delta q_{MNT,i} &= {}^{GIM}q_{MNT,i} \otimes {}^{GIM}\hat{q}_{MNT,i}^{-1} \\
&= \delta q_{NP} \otimes \hat{q}_{NP} \otimes q_{g2,i} \otimes (\delta q_{NP} \otimes \hat{q}_{NP})^{-1} \otimes q_{g1,i} \cdots \otimes \\
&\quad (\hat{q}_{NP} \otimes q_{g2,i} \otimes \hat{q}_{NP}^{-1} \otimes q_{g1,i})^{-1} \\
&= \delta q_{NP} \otimes \hat{q}_{alt,i} \otimes \delta q_{NP}^{-1} \otimes \hat{q}_{alt,i}^{-1} \\
&= \delta q_{NP} \otimes \begin{bmatrix} A(\hat{q}_{alt,i}) & 0 \\ 0 & 1 \end{bmatrix} \delta q_{NP}^{-1}
\end{aligned} \quad (22)$$

The vector portion of the error quaternion from Eq. 22 can be approximated as:

$$^{GIM}\delta Q_{MNT,i} \approx (I_{3\times 3} - A(\hat{q}_{alt,i}))\delta Q_{NP} \quad (23)$$

Finally, $\delta q_{NP}$ should be related to $\delta\theta_{NP}$ from the state. This relationship is given by:

$$\begin{aligned}
\delta q_{NP} &= q_{NP} \otimes \hat{q}_{NP}^{-1} \\
&= \begin{bmatrix} 0 \\ 0 \\ \cos\frac{\theta_{NP}}{2}\sin\frac{\hat{\theta}_{NP}}{2} - \sin\frac{\theta_{NP}}{2}\cos\frac{\hat{\theta}_{NP}}{2} \\ \cos\frac{\theta_{NP}}{2}\cos\frac{\hat{\theta}_{NP}}{2} - \sin\frac{\theta_{NP}}{2}\sin\frac{\hat{\theta}_{NP}}{2} \end{bmatrix} \\
&\approx \begin{bmatrix} 0 \\ 0 \\ -\delta\theta_{NP}/2 \\ 1 \end{bmatrix}
\end{aligned} \quad (24)$$

Combining this result with Eq. 23 yields the overall approximation:

$$^{GIM}\delta Q_{MNT,i} \approx -\frac{1}{2}(I_{3\times 3} - A(\hat{q}_{alt,i}))\begin{bmatrix} 0 \\ 0 \\ 1 \end{bmatrix}\delta\theta_{NP} \quad (25)$$

Returning to Eq. 18, it is possible to relate $^{TOBS}\delta Q_{TNOM,i}$ to the state components. Equations 10-12 describe the rotation from the nominal telescope frame to the observed telescope frame. Following the form of Eq. 2 yields the following relation for the error quaternion from the nominal to observed telescope frame at the $i^{th}$ measurement:

$$^{TOBS}\delta q_{TNOM,i} = {}^{TOBS}q_{TNOM,i} \otimes {}^{TOBS}\hat{q}_{TNOM,i}^{-1} \quad (26)$$

-continued $$= \begin{bmatrix} \sin\left(\frac{1}{2}(\hat{a}_f + \delta a_d)(\hat{c}_{f,i} + \delta c_{d,i})\right)(\hat{v}_{f,i} + \delta v_{d,i}) \\ \cos\left(\frac{1}{2}(\hat{a}_f + \delta a_d)(\hat{c}_{f,i} + \delta c_{d,i})\right) \end{bmatrix} \dots \otimes$$

$$\begin{bmatrix} -\sin\left(\frac{1}{2}\hat{a}_f \hat{c}_{f,i}\right)\hat{v}_{f,i} \\ \cos\left(\frac{1}{2}\hat{a}_f \hat{c}_{f,i}\right) \end{bmatrix}$$

The vector component of this quaternion multiplication becomes:

$$^{TOBS}\delta Q_{TNOM,i} = -\cos\left(\frac{1}{2}(\hat{a}_f + \delta a_d)(\hat{c}_{f,i} + \delta c_{d,i})\right)\sin\left(\frac{1}{2}\hat{a}_f \hat{c}_{f,i}\right)\hat{v}_{f,i} \dots + \quad (27)$$

$$\cos\left(\frac{1}{2}\hat{a}_f \hat{c}_{f,i}\right)\sin\left(\frac{1}{2}(\hat{a}_f + \delta a_d)(\hat{c}_{f,i} + \delta c_{d,i})\right)(\hat{v}_{f,i} + \delta v_{d,i}) \dots +$$

$$\sin\left(\frac{1}{2}\hat{a}_f \hat{c}_{f,i}\right)\sin\left(\frac{1}{2}(\hat{a}_f + \delta a_d)(\hat{c}_{f,i} + \delta c_{d,i})\right)\delta v_{d,i} \times \hat{v}_{f,i}$$

Using a trigonometric expansion, small angle approximation for trigonometric functions of $\delta a_d$ and $\delta c_{d,i}$, and ignoring second order terms yields:

$$^{TOBS}\delta Q_{TNOM,i} \approx \frac{\hat{c}_{f,i}}{2}\hat{v}_{f,i}\delta a_d + \quad (28)$$

$$\frac{\hat{a}_f}{2}\hat{v}_{f,i}\delta c_{d,i} \dots + \left(\frac{1}{2}\sin(\hat{a}_f \hat{c}_{f,i}) - \sin^2\left(\frac{1}{2}\hat{a}_f \hat{c}_{f,i}\right)\hat{v}_{f,i}^\times\right)\delta v_{d,i}$$

While $\delta a_d$ is a component of the state, $\delta c_{d,i}$ and $\delta v_{d,i}$ should be related to the state. Looking first at $\delta c_{d,i}$ gives:

$$\delta c_{d,i} = c_{d,i} - \hat{c}_{f,i} \quad (29)$$

$$= \left(1 - \left(\left(A^{(TNOM}(\delta q \otimes \hat{q})_{ENU,i}^{-1})\begin{bmatrix}0\\0\\1\end{bmatrix}\right)\cdot\begin{bmatrix}0\\0\\1\end{bmatrix}\right)^2\right)^{\frac{1}{2}} \dots -$$

$$\left(1 - \left(\left(A^{(TNOM}\hat{q}_{ENU,i}^{-1})\begin{bmatrix}0\\0\\1\end{bmatrix}\right)\cdot\begin{bmatrix}0\\0\\1\end{bmatrix}\right)^2\right)^{\frac{1}{2}}$$

To first order, this can be approximated by:

$$\delta c_{d,i} \approx \quad (30)$$

$$\left[1 - \left[\begin{array}{c}A_{33}(^{TNOM}\hat{q}_{ENU,i}^{-1}) + 2A_{31}(^{TNOM}\hat{q}_{ENU,i}^{-1})(^{TNOM}\delta q_{ENU,i})_1 \dots - \\ 2A_{32}(^{TNOM}\hat{q}_{ENU,i}^{-1})(^{TNOM}\delta q_{ENU,i})_0 \end{array}\right]^2\right]^{\frac{1}{2}} \dots -$$

$$\left[1 - A_{33}(^{TNOM}\hat{q}_{ENU,i}^{-1})^2\right]^{\frac{1}{2}}$$

where the subscript $A_{ij}$ denotes the $i^{th}$ row and $j^{th}$ column of the matrix and the subscript $(\delta q)_i$ denotes the $i^{th}$ vector element.

Performing a Maclaurin expansion of Eq. 30 to first order provides an approximation relating $\delta c_{d,i}$ to $^{TNOM}\delta Q_{ENU,i}$ as follows:

$$\delta c_{d,i} \approx v_{c,i} \cdot {}^{TNOM}\delta Q_{ENU,i} \quad (31)$$

$$v_{c,i} = \begin{bmatrix} \dfrac{2A_{32}(^{TNOM}\hat{q}_{ENU,i}^{-1})A_{33}(^{TNOM}\hat{q}_{ENU,i}^{-1})}{(1 - A_{33}(^{TNOM}\hat{q}_{ENU,i}^{-1})^2)^{\frac{1}{2}}} \\ \dfrac{-2A_{31}(^{TNOM}\hat{q}_{ENU,i}^{-1})A_{33}(^{TNOM}\hat{q}_{ENU,i}^{-1})}{(1 - A_{33}(^{TNOM}\hat{q}_{ENU,i}^{-1})^2)^{\frac{1}{2}}} \\ 0 \end{bmatrix} \quad (32)$$

where $v_{c,i}$ is introduced for notational simplicity.

Finally, note that $^{TNOM}\delta Q_{ENU,i}$ is related to the state by:

$$^{TNOM}\delta Q_{ENU,i} \approx {}^{TNOM}\delta Q_{GIM} + A(^{TNOM}\hat{q}_{GIM})^{GIM}\delta Q_{MNT,i} \dots + A(^{TNOM}\hat{q}_{MNT,i})^{MNT}\delta Q_{ENU} \quad (33)$$

Combined with Equations 25 and 31, this approximates the relationship between $\delta c_{d,i}$ and the state.

Similarly, $\delta v_{d,i}$ is related to the state:

$$\delta v_{d,i} = v_{d,i} - \hat{v}_{f,i} \quad (34)$$

$$= \frac{\left(A(^{TNOM}(\delta q \otimes \hat{q})_{ENU,i})\begin{bmatrix}0\\0\\1\end{bmatrix}\right) \times \begin{bmatrix}0\\0\\1\end{bmatrix}}{\left\|\left(A(^{TNOM}(\delta q \otimes \hat{q})_{ENU,i})\begin{bmatrix}0\\0\\1\end{bmatrix}\right) \times \begin{bmatrix}0\\0\\1\end{bmatrix}\right\|} \dots -$$

$$\frac{\left(A(^{TNOM}\hat{q}_{ENU,i})\begin{bmatrix}0\\0\\1\end{bmatrix}\right) \times \begin{bmatrix}0\\0\\1\end{bmatrix}}{\left\|\left(A(^{TNOM}\hat{q}_{ENU,i})\begin{bmatrix}0\\0\\1\end{bmatrix}\right) \times \begin{bmatrix}0\\0\\1\end{bmatrix}\right\|}$$

For notational simplicity, let $A_{ij}$ refer to $A_{ij}(^{TNOM}\hat{q}_{ENU,i})$. Multiplying out the terms of this equation and doing a first order Maclaurin expansion yields the approximation:

$$\delta v_{d,i} \approx M_i {}^{TNOM}\delta Q_{ENU,i} \quad (35)$$

$$M_i = \begin{bmatrix} \dfrac{2A_{33}(A_{13}^2 + A_{23}^2)^2 - 2A_{23}A_{33}^2}{(A_{13}^2 + A_{23}^2)^{\frac{3}{2}}} & \dfrac{2A_{13}A_{23}A_{33}}{(A_{13}^2 + A_{23}^2)^{\frac{3}{2}}} & \dfrac{-2A_{13}}{(A_{13}^2 + A_{23}^2)^{\frac{1}{2}}} \\ \dfrac{2A_{13}A_{23}A_{33}}{(A_{13}^2 + A_{23}^2)^{\frac{3}{2}}} & \dfrac{2A_{33}(A_{13}^2 + A_{23}^2)^2 - 2A_{13}A_{33}^2}{(A_{13}^2 + A_{23}^2)^{\frac{3}{2}}} & \dfrac{-2A_{23}}{(A_{13}^2 + A_{23}^2)^{\frac{1}{2}}} \\ 0 & 0 & 0 \end{bmatrix} \quad (36)$$

where $M_i$ is introduced for notational simplicity. Combining this with Equations 33 and 25 completes the relationship between $\delta v_{d,i}$ and the state.

Overall, combining Equations 18, 25, 28, 31, 33, 35, and 36 yields a linearization of the form:

$$^{ST}\delta Q_{J2K,i} = H_i \delta x_i + Q_{n,i} \quad (37)$$

where $H_i$ is a matrix of partial derivatives, $\delta x_i$ is the state correction. The matrix $H_i$ is composed of:

$$H_i = \begin{bmatrix} \dfrac{\partial^{ST}\delta Q_{J2K,i}}{\partial \delta a_d} & \dfrac{\partial^{ST}\delta Q_{J2K,i}}{\partial^{TNOM}\delta Q_{GIM}} & \dfrac{\partial^{ST}\delta Q_{J2K,i}}{\partial \delta \theta_{NP}} & \dfrac{\partial^{ST}\delta Q_{J2K,i}}{\partial^{MNT}\delta Q_{ENU}} \end{bmatrix} \quad (38)$$

Equations 18, 25, 28, 31, 33, 35, 36 and some algebra yields the following approximations for the partial derivatives:

$$\frac{\partial^{ST}\delta Q_{J2K,i}}{\partial \delta a_d} \approx \frac{\hat{c}_{f,i}}{2} A(^{ST}q_{TOBS})v_{d,i} \quad (39)$$

$$\frac{\partial^{ST}\delta Q_{J2K,i}}{\partial^{TNOM}\delta Q_{GIM}} \approx A(^{ST}\hat{q}_{TNOM,i}) +$$

$$A(^{ST}q_{TOBS}) \cdots \left[ \frac{\hat{a}_f}{2} \hat{v}_{d,i} v_{c,i}^T + \left( \frac{1}{2}\sin(\hat{a}_d \hat{c}_{d,i}) - \sin^2\left(\frac{1}{2}\hat{a}_d \hat{c}_{d,i}\right)\right) \hat{v}_{d,i}^x \right] M_i \quad (40)$$

$$\frac{\partial^{ST}\delta Q_{J2K,i}}{\partial \delta \theta_{NP}} \approx -\frac{1}{2}\Big[ A(^{ST}\hat{q}_{GIM,i}) + A(^{ST}q_{TOBS}) \quad (41)$$

$$\left[ \frac{\hat{a}_d}{2}\hat{v}_{d,i}v_{c,i}^T \cdots + \left(\frac{1}{2}\sin(\hat{a}_d \hat{c}_{d,i}) - \sin^2\left(\frac{1}{2}\hat{a}_d \hat{c}_{d,i}\right)\right) \hat{v}_{d,i}^x \right] M_i $$

$$A(^{TNOM}\hat{q}_{GIM}) \Big] \cdots (I_{3\times 3} - A(\hat{q}_{alt,i})) \begin{bmatrix} 0 \\ 0 \\ 1 \end{bmatrix}$$

$$\frac{\partial^{ST}\delta Q_{J2K,i}}{\partial^{MNT}\delta Q_{ENU}} \approx A(^{ST}\hat{q}_{MNT,i}) + \quad (42)$$

$$A(^{ST}q_{TOBS})\left[\frac{\hat{a}_d}{2}\hat{v}_{d,i}v_{c,i}^T \cdots + \left(\frac{1}{2}\sin(\hat{a}_d \hat{c}_{d,i}) - \sin^2\left(\frac{1}{2}\hat{a}_d \hat{c}_{d,i}\right)\right)\hat{v}_{d,i}^x\right] M_i$$

$$A(^{TNOM}\hat{q}_{MNT,i})$$

Combining multiple measurements makes it possible to do an iterative nonlinear least squares process. For n measurements, the measurement errors are related to state errors as:

$$\begin{bmatrix} ^{ST}\delta Q_{J2K,1} \\ \vdots \\ ^{ST}\delta Q_{J2K,n} \end{bmatrix} = \begin{bmatrix} H_1 \\ \vdots \\ H_n \end{bmatrix} \delta x_k + \begin{bmatrix} Q_{n,1} \\ \vdots \\ Q_{n,n} \end{bmatrix} \quad (43)$$

This equation is of the form:

$$\delta y_k = H\delta x_k + \vec{\omega} \quad (44)$$

where k is the iteration number and the covariance of $\vec{\omega}$ is a diagonal matrix R which corresponds with the measurement noise covariance. Using iterative least squares, the state update is given by:

$$\delta x_k = (H^T R^{-1} H)^{-1} H^T R^{-1} \delta y_k \quad (45)$$

The quaternions $^{TNOM}\hat{q}_{GIM}$ and $^{MNT}\hat{q}_{ENu}$ are updated with a quaternion product and the state components $\hat{\theta}_{NP}$ and $\hat{\alpha}_f$ are updated additively. Iterations continue until the estimate converges.

Main Camera Images

The pointing model and the calibration parameters provide have a framework for representing images from the main camera behind the telescope. With this measurement model, it is possible to determine how to provide angle inputs to the mount to look at a desired target.

Let $r_{pnt|J2K}$ be the unit pointing vector from the telescope to the satellite in the J2K frame. This pointing vector is given by:

$$r_{pnt}|_{J2K} = \frac{r_{targ}|_{J2K} - r_{gs}|_{J2K}}{\|r_{tart}|_{J2K} - r_{gs}|_{J2K}\|} \quad (46)$$

where $r_{targ|J2K}$ is the target in the J2K frame and $r_{gs|J2K}$ is the ground station in the J2K frame.

Let $r_{pnt|TOBS}$ be the desired vector to the target in the observed telescope frame (e.g., the boresight vector, but the object could be placed else on the detector). The relationship between the pointing vector in the observed telescope frame and the J2K frame is given by:

$$r_{pnt|TOBS} = A(^{TOBS}q_{TNOM} \otimes{}^{TNOM}q_{GIM} \otimes{}^{GIM}q_{MNT}$$
$$\otimes{}^{MNT}q_{ENU} \otimes{}^{ENU}q_{J2K})r_{pnt|J2k} \quad (47)$$

The gimbal angles appear in both $^{TOBS}q_{TNOM}$, which describes the vertical deflection of the telescope, and $^{GIM}q_{MNT}$, which executes the gimbal rotation. To simplify, assume that $^{TOBS}q_{TNOM}$ can be evaluated based on the target azimuth and elevation, which can be determined from $r_{pnt|ENU}$. This assumption essentially states that the vertical deflection from the undeflected position is approximately the same as the vertical deflection at the desired location. Since for a reasonable telescope the deflection is less than a degree in elevation and deflection is proportional to the cosine of the elevation angle, this is justified.

This assumption allows the problem to be simplified greatly. The gimbal angles only appear in the $^{GIM}q_{MNT}$ transformation, so the problem can be presented as:

$$r=_{pnt|GIM} = A(^{GIM}q_{MNT})r_{pnt|MNT} \quad (48)$$

where $r_{pnt|GIM}$ and $r_{pnt|MNT}$ are determined by multiplying the appropriate transformations.

Equation 48 provides three equations with a unit vector constraint. Next, solve for the two unknowns azimuth $\psi_{gim}$ and altitude $\alpha_{gim}$. Substituting Equations 7-9 into 48 yields the desired gimbal angles.

Ground Station Tracking

As described above, most existing optical ground stations and satellite tracking telescopes generate a series of predetermined angle commands for tracking a satellite or other spacecraft. Closed-loop control is then executed by applying angular corrections. Conversely, an inventive ground station can use rate commands for improved tracking and estimating orbit and rate parameters with a real-time extended Kalman filter.

Tracking a satellite involves calculating the gimbal angles (e.g., azimuth (Azi) and altitude (Alt)) and the rate of each gimbal. This section includes derivations for the analytical solution for Azi and Alt as well as their rates for a given position and velocity of a satellite, which is estimated from the SGP4.

Open-Loop Rate Commands

A telescope gimbal in an inventive ground station is naturally driven by rate. The telescope/mount system responds to angle commands using an internal controller and encoder feedback. (An amateur telescope user does not have access to this controller, and the controller is not optimized for trajectory tracking.) Instead of driving the telescope/mount system with angle commands, the ground station processor drives the telescope mount with rate commands. Thses open-loop rate commands can be generated by differentiating Equation 48 (above) and using it to implicitly solve for the azimuth $\dot{\psi}_{gim}$ and altitude $\dot{\alpha}_{gim}$ gimbal rate commands.

Gimbal Angle Command

To point the telescope at the satellite, the telescope's line-of-sight (LOS) unit vector in the camera frame should be aligned with the unit pointing vector from the telescope to the satellite in the ECI (e.g., J2K) frame. The telescope's LOS unit vector in the camera frame can be obtained by manual calibration as described above. The unit pointing vector from the telescope to a satellite in the ECI frame is given by the normalized distance from the position of the satellite and the position of the ground station in the ECI frame. This condition is satisfied if the telescope LOS unit vector equals the unit pointing vector transformed first from the ECI frame to an Earth-centered-Earth-fixed (ECEF) frame, then from the ECEF frame to the gimbal frame, from the gimbal frame to the telescope frame, and from the telescope frame to the camera frame. This transformation yields a set of equations that can be solved analytically for the Azi and Alt angles.

Gimbal Angle Rate Command

The Azi and Alt rates can be derived from the time derivative of the LOS vector in the telescope frame. Since the telescope LOS is fixed in the telescope frame, the time derivative of the LOS in the gimbal frame depends on the time derivative of the transformation (e.g., as expressed by a direct cosine matrix) from the gimbal frame to the telescope frame.

Gimbal Control Law

The CPC 1100 telescope is a commercial off the shelf (COTS) amateur telescope that can be controlled with Azi and Alt slew rates as input commands. The telescope also takes Azi/Alt or RA/DEC angle commands, but the Azi/Alt angle command has very large overshoot and the RA/DEC command can only be used after the built-in alignment calibration. Since the dynamics of the gimbal mount are unknown and there is no information about the internal control loop, the commanded Azi and Alt rates obey a simple control law:

$$\dot{z}_c = \dot{z}_d + \frac{1}{T_s}(z_d - z_r)$$

$$\dot{t}_c = \dot{t}_d + \frac{1}{T_s}(t_d - t_r)$$

where $\dot{z}_d$ and $\dot{t}_d$ are the desired Azi and Alt slew rates, respectively; $z_d$ and $t_d$ are the desired Azi and Alt angles, respectively; and $z_r$ and $t_r$ are the current Azi and Alt angle readings, respectively, from the encoders on the telescope mount. $T_s$ is the settling time for the error angle compensation, the value of which can be selected by trial-and-error (e.g., to be 0.3 sec for the indoor test described below).

Closed-Loop Feedback Control and Rate Commands

If there is no error or noise in the telescope tracking, feedback control isn't necessary—rate commands based on known orbital elements can provide open-loop tracking capabilities. However, there are several error sources that can occur in actual satellite tracking, so feeding back the satellite's position as measured by some sensing device to the gimbals can counteract drift. For instance, once the target is acquired, a rate-based feedback controller can provide fine guidance. Tracking can be improved even further by estimating uncertainties in the orbit determination and mount model.

Regarding orbit determination, there can be a large error in the predicted position of the target satellite, particularly in the in-track direction. Any timing error present in the mount and control system may have a similar effect. Another source of uncertainty is in the telescope alignment. While professional telescopes are in an environment that is controlled enough to maintain a static alignment after calibration, the same is not necessarily true of a rapidly deployed amateur telescope. Rather than performing the calibration procedure once and assuming it is maintained, an inventive ground station can perform a continued estimation of some of the mount alignment parameters described above.

For instance, the ground station processor may implement an extended Kalman filter that includes the satellite position and velocity, as well as the quaternion rotation from the ENU frame to the mount frame, $^{MNT}q_{ENU}$. This rotation captures any motion of the telescope base that would be a likely candidate for pointing error. The state is given by:

$$x = \begin{bmatrix} r_{targ}|_{J2K} \\ \dot{r}_{targ}|_{J2K} \\ ^{MNT}q_{ENU} \end{bmatrix} \tag{49}$$

Demonstration of a Portable Optical Ground Station

This section discloses the demonstration of an example portable optical ground station at MIT STAR Lab. It details the validation of the pointing approach, experiments on satellite tracking, and in-lab testing of the receiver assembly.

Ground Station Pointing and Tracking

Ground station pointing and tracking tests were conducted on the roof of MIT Building 37, first by imaging stars for calibration and then tracking the International Space Station (ISS) as a test of the telescope tracking capabilities.

The ISS was successfully tracked on May 26, 2016, from 07:14:00 to 07:21:31 UTC using feedback from the star tracker. It was possible to use the star tracker for closed-loop feedback because the ISS is a bright target at visible wavelengths. The FOV of the star tracker is 7.8×5.9 degrees, so open-loop tracking was able to capture the ISS. The ISS as seen from the star tracker is shown in circled in FIG. 19.

Using feedback from the star camera, the telescope could lock on to the ISS to pull it within the 282×212 arcsecond FOV of a camera behind the telescope. The ISS in the main camera behind the telescope is shown in FIG. 20. (Star tracker feedback may not be available if the target (e.g., a satellite) reflects less sunlight than the ISS.) The star camera used in this demonstration could not detect the shortwave infrared wavelengths used for communication. But it was used to improve the open-loop tracking so that the target could be seen in the IR tracking camera behind the telescope.

In the initial approach, six pointing terms were estimated from star tracker images and the overall pointing residual error was up to ±220 arcseconds. Each star tracker image had overall star residuals of 10-20 arcseconds RMS. This is a static error term that may combine with other tracking errors, such as orbit determination error and mount control error. In the successful ISS tracking test, the initial open-loop tracking error was 828 arcseconds. The field of view of the camera coupled to the telescope in this demonstration was on the order of ±500 arcseconds. Bridging this open-loop tracking gap ensures the satellite can be seen.

Alignment Calibration Results

The first step of the ISS tracking was the alignment calibration. The processor automatically planned the star imaging schedule with different gimbal angles and executes the alignment process. It rotated the telescope to 18 different gimbal angles and captured images at each set of gimbal angles with the star camera. Once it finished its scan, it calculated the alignment as described above. After the calibration, two residual errors were used as accuracy metrics to evaluate performance.

The first metric was the residual error of the star vectors in each star image. This provided an estimate of the accuracy for each individual star camera image. Once an attitude quaternion was calculated from the star vectors for a star pattern image, the processor could calculate the expected position of the stars on the image. Then, the processor calculated the difference between the measured star vectors and the expected star vectors.

The second metric was the residual of the attitude quaternions from the star images. This provided an estimate of the global calibration accuracy. When the alignment calibration was finished, the residual of the error quaternion was calculated by the processor. TABLE 3 shows the alignment results. In this ISS tracking test, 12 out of 18 star pattern images were used for the calibration. The 6 images rejected for calibration did not have enough (<6) observed stars due to clouds or other visual obstructions.

The root-mean-square (RMS) error of the star vectors is 10-20 arcsec within each image, which means the expected attitude accuracy for each measurement is 10-20 arcsec (1σ) in the cross-boresight direction, or X and Y axes of the star camera frame. However, the residual quaternion errors in the cross-boresight direction go up to 220 arcsec, which is substantially more than the star vector residual RMS of 10-20 arcsec. The residual errors in the star camera frame are the very close to the expected pointing errors in the telescope frame since the LOS of the telescope is very close to the Z axis of camera frame. Since the FOV of the telescope with the eyepiece camera is 282 arcsec×212 arcsec, if the pointing error is more than 106 arcsec, the ISS will not be captured on the eyepiece camera.

There are several sources of the large errors seen in the global accuracy residuals. Without being bound by any particular theory, sources of error include deformation of the mount as well as the deformation of the non-rigid floor. The telescope and the gimbal mount were on a tripod, which lacked the structural stability of standard ground stations. Additionally, no housing was used for this test, and wind can significantly perturb the telescope. If the load on each leg of the tripod changed, the mount and floor would have been deformed differently, causing the ECEF-to-gimbal quaternion to change. For different Azi/Alt angles, the center of gravity may have changed, causing potentially significant error.

Another expected error source was timing error. The ground station uses a Windows operating system rather than a real-time operating system (RTOS). The time is synchronized via the internet, so there can be errors up to 1 sec resulting in an incorrect value for the ECI-to-ECER quaternion. However, this was not the dominant error source since the Earth's rotation rate is small at 15 arcsec/sec, whereas the residual quaternion error goes up to 200 arcsec.

TABLE 3

Results from alignment calibration.

| No. | # of Stars | Azi (deg) | Alt (deg) | RMS residual star vector (arcsec) | Residual quaternion, X-axis (arcsec) | Residual quaternion, Y-axis (arcsec) | Residual quaternion, Z-axis (arcsec) |
|---|---|---|---|---|---|---|---|
| 1 | 12 | 360.00 | 30.00 | 10.01 | 197.29 | −10.45 | −106.61 |
| 2 | 9 | 60.00 | 30.00 | 18.93 | −100.51 | −147.90 | −206.55 |
| 3 | 11 | 180.00 | 30.00 | 22.75 | −49.46 | 133.01 | −9.29 |
| 4 | 12 | 288.00 | 43.75 | 12.63 | 73.83 | 68.71 | 279.88 |
| 5 | 10 | 216.00 | 43.75 | 17.53 | 44.35 | 188.85 | 273.32 |
| 6 | 10 | 144.00 | 43.75 | 13.81 | 28.22 | −24.09 | −7.73 |
| 7 | 9 | 72.00 | 43.75 | 11.16 | 19.18 | −176.87 | −204.96 |
| 8 | 10 | 360.00 | 43.75 | 14.95 | 198.05 | −2.35 | −70.39 |
| 9 | 7 | 360.00 | 57.50 | 10.55 | 221.94 | 29.81 | −32.71 |
| 10 | 10 | 90.00 | 57.50 | 16.27 | 0.91 | −125.61 | −206.30 |
| 11 | 6 | 180.00 | 57.50 | 20.08 | 45.55 | 47.51 | 100.33 |
| 12 | 9 | 180.00 | 71.25 | 20.51 | 72.91 | 11.93 | 191.01 |
| RMS | n/a | n/a | n/a | 16.28 | 113.99 | 104.48 | 169.4 |

Regardless of the source, certain pointing error does exist that goes up to 200 arcsec, which is much more than the half of the FOV of 106 arcsec. This means that open-loop control will not ensure that the ISS is captured by the telescope, so we need feedback control of the ISS pointing vector to enable tracking.

ISS Tracking Results

With the alignment calibrated, the ground station tracked the ISS. Unlike in the case of alignment calibration, the timing error during tracking caused large errors since the satellite was moving at >7 km/sec. This error can be compensated by closed-loop feedback control.

The star camera was used as the tracking sensor of the ISS. In the optical ground station configuration, an IR camera can be used to measure the relative pointing vector to the satellite. However, for ease of testing, the star camera was used to track the ISS in the visible wavelength region of the electromagnetic spectrum. The star camera performed initial alignment calibration, so it was not performing any functions during the tracking. Thus it could be used in lieu of an IR camera to test the approach using the star camera for visible feedback.

The ISS vector update period was 3 to 4 sec. According to the iNova camera manual, the star camera can achieve 30 frames per second (fps), but this was not possible with the iNova SDK 1.2.4 in C#. The feedback frequency of ~0.3 Hz was not high, but it was sufficient to capture the ISS in the 282 arcsec×212 arcsec FOV.

During the test, the ground station recorded a video of the ISS. FIG. 19 shows a screen capture of the video. The ISS stayed in the screen most of time when the ground station used the feedback control, although it was floating around on the screen. The floating motion was expected to be due to the low feedback frequency. Other trackers, such as an IR camera, may have a much higher feedback rate.

FIGS. 21 and 22 show the Azi/Alt angle profiles and the control errors. The control error, shown in FIG. 22, is defined as the difference between the commanded angles and the angles measured from the telescope mount. It is not a measure of true error, but rather how well the mount tracked input commands. The first feedback was applied at 117 sec after the tracking start, which appears as the first huge peak on FIG. 22. The magnitude of the angle error at the first feedback was 828 arcsec, which is the initial open-loop pointing error. The first feedback time was 117 sec after the tracking start due to visual obstructions in the FOV of the star camera.

FIG. 23 shows the ISS tracking error during the tracking. The error is the off-center distance of ISS image center and is calculated from each frame of the video. The RMS error through the tracking is 42.814 arcsec in X axis and 36.337 arcsec in Y axis, or 56.15 arcsec in total. This test result shows that it is possible to track a satellite with an amateur telescope.

Simulated Pointing Results

The pointing calibration process described above was tested in a Matlab simulation. Twelve measurements were simulated covering the hemispherical portion above 30 degrees elevation. Each measurement was simulated with Gaussian noise with a 20-arcsecond, 1σ distribution, which is worse than what was seen experimentally from the star tracker. In lieu of coarse calibration, large initial parameter errors were inserted to ensure the fine calibration procedure converges. TABLE 4 lists the parameters used in the simulation.

Eight pointing terms were estimated. The nonlinear least squares process converged within a few iterations, as seen in FIG. 24. The vertical deflection term and gimbal nonperpendicularity terms converge even when coarsely estimated as zero. The two quaternion rotations (1) between the gimbal frame and the nominal telescope frame and (2) between the mount frame and the east-north-up frame both converged with coarse estimates on the order of 10 degrees error in each axis. These results indicate that the derivation above is mathematically sound and that the linearizations are appropriate.

TABLE 4

Summary of simulation parameters for nonlinear least squares telescope pointing calibration.

| Parameter | Value | Initial Guess |
|---|---|---|
| $^{MNT}q_{ENU}$ | $\begin{bmatrix} -0.690 \\ 0.098 \\ -0.195 \\ 0.690 \end{bmatrix}$ | $\begin{bmatrix} -0.648 \\ 0.094 \\ -0.197 \\ 0.730 \end{bmatrix}$ |
| $\theta_{NP}$ | 5° | 0° |
| $^{TNOM}q_{GIM}$ | $\begin{bmatrix} -0.017 \\ 0.035 \\ 0.009 \\ 0.999 \end{bmatrix}$ | $\begin{bmatrix} -0.030 \\ 0.059 \\ -0.036 \\ 0.997 \end{bmatrix}$ |
| $a_d$ | 0.05 | 0 |

In-Lab Testing of the Receiver Assembly

The back-end of the telescope was assembled (see FIG. 18) and preliminary testing was conducted over-the-air with the transmitter. Fine tracking software was developed prior to this testing and itself tested in lab. A 1550 nm laser was connected to a 2″ collimator. The collimator was aligned with the telescope across the lab, as shown in FIG. 25, and the benchtop transmitter signal was launched into free space from the collimator to the ground station assembly across the lab.

Knowing which spot on the tracking camera corresponded with peak power on the APD made executing fine tracking easier. To find peak power on the APD, software executed by the processor in the laptop scanned a grid across the entire range of the FSM. At each step, the processor measured an image centroid on the tracking camera and the power from the APD was read with an oscilloscope connected to the laptop.

After scanning through the full grid, the step size of the FSM was halved and the grid was re-centered on the maximum power point of the prior iteration. The iterations continued until the change in maximum power was less than 1%. This gave the location on the tracking camera that the signal was steered to.

Having implemented the steering software, the ground station was sufficiently developed to enable end-to-end testing with the transmitter. This was accomplished by successfully transmitting a signal across the laboratory from the transmitter to the ground station receiver. This was the first over-the-air test. While the transmitter in the lab was stationary, the test was a first validation of the ground station fine tracking system.

This test was conducted in an indoor lab to compare the measured mount angles to the commanded mount angles. A processor generated a mount angle and slew rate profile for a sample ISS tracking case whose maximum elevation angle was 35 degrees. This case was used to check that the control law above worked properly. Picking a settling time for the error angle compensation of 0.3 seconds yielded the following tracking results shown in FIGS. 26 and 27.

FIG. 26 shows the Azi/Alt angle profiles measured from the mount for the ISS tracking maneuver. FIG. 27 shows the angle errors, $z_d - z_r$ and $t_d - t_r$, as well as the commanded slew rates. This plot shows that the system experiences lagging when the slew rate is high (>1000 arcsec/sec), but the error was within 10 arcsec, which is sufficient to capture the ISS considering the FOV of 282 arcsec×212 arcsec in this scenario.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of pointing a telescope mounted on a gimbal at a satellite, the method comprising:
    acquiring a plurality of star camera images with a star camera affixed to the telescope at respective gimbal positions in a plurality of gimbal positions, each star camera image in the plurality of star camera images being at a different gimbal position in the plurality of gimbal positions;
    determining an alignment of the gimbal to an Earth-centered reference frame and an alignment of the star camera to the gimbal based on the plurality of star camera images and the plurality of gimbal positions; and
    pointing the telescope at the satellite based on the alignment of the gimbal to the Earth-centered reference frame, the alignment of the star camera to the gimbal, and an alignment of the telescope to the star camera.

2. The method of claim 1, wherein acquiring the plurality of star camera images comprises rotating the telescope and the star camera to a plurality of azimuth angles and a plurality of altitude angles with the gimbal.

3. The method of claim 1, wherein acquiring the plurality of star camera images occurs within one hour.

4. The method of claim 1, wherein determining the alignment of the gimbal to the Earth-centered reference frame and the alignment of the star camera to the gimbal comprises:
    determining an alignment of the telescope to the gimbal based on the plurality of gimbal positions.

5. The method of claim 1, further comprising:
    determining the alignment of the telescope to the star camera.

6. The method of claim 5, where determining the alignment of the telescope to the star camera comprises:
    acquiring an image with an image sensor in optical communication with an eyepiece of the telescope; and
    correlating the image to at least one star camera image in the plurality of star camera images.

7. The method of claim 1, wherein pointing the telescope at the satellite is at a root-mean-square error of less than 180 arcseconds.

8. The method of claim 1, wherein the star camera has a wider field of view than the telescope.

9. The method of claim 1, further comprising:
    tracking the satellite with the telescope.

10. The method of claim 9, wherein tracking the satellite with the telescope comprises:
    estimating a change in azimuth angle and/or altitude angle of the satellite based in part on the alignment of the gimbal to the Earth-centered reference frame and the alignment of the star camera to the gimbal.

11. A ground station for communicating with a satellite, the ground station comprising:
    a telescope to receive an optical signal from the satellite;
    a gimbal, supporting the telescope, to rotate the telescope through a plurality of gimbal positions;
    a star camera, attached to the telescope, to capture a plurality of star camera images, each star camera image in the plurality of star camera image being at a different gimbal position in the plurality of gimbal positions; and
    a processor, operably coupled to the imager and the star camera, to determine an alignment of the gimbal to an Earth-centered reference frame and an alignment of the star camera to the gimbal based on the plurality of star camera images and the plurality of gimbal positions and to command the gimbal to point the telescope at the satellite based on the alignment of the gimbal to the Earth-centered reference frame, the alignment of the star camera to the gimbal, and an alignment of the telescope to the star camera.

12. The ground station of claim 11, wherein the ground station weighs less than about 50 kilograms.

13. The ground station of claim 11, wherein the telescope has a lens aperture of less than about 1 meter.

14. The ground station of claim 11, wherein the gimbal is a two-axis gimbal.

15. The ground station of claim 11, further comprising:
    an image sensor, in optical communication with an eyepiece of the telescope, to acquire a plurality of telescope images at respective gimbal positions in the plurality of gimbal positions, each telescope image in the plurality of telescope images being at a different gimbal position in the plurality of gimbal positions.

16. The ground station of claim 15, wherein the processor is configured to compensate for error in pointing the telescope at the satellite based on images from at least one of the star camera or the image sensor.

17. The ground station of claim 15, wherein the star camera has a field of view wider than that of the image sensor.

18. The ground station of claim 11, further comprising:
    a photodetector, in optical communication with an eyepiece of the telescope, to sense the optical signal from the satellite via the telescope.

19. The ground station of claim 11, further comprising:
    an encoder, operably coupled to the gimbal, to measure a change in angle of the gimbal about at least one axis.

\* \* \* \* \*